US011164130B2

(12) United States Patent
Weatherhead et al.

(10) Patent No.: US 11,164,130 B2
(45) Date of Patent: *Nov. 2, 2021

(54) SYSTEMS AND METHODS FOR CLOUD-BASED COMMISSIONING OF WELL DEVICES

(71) Applicant: Sensia Netherlands B.V., The Hague (NL)

(72) Inventors: Andrew Weatherhead, Kitchener (CA); Edward Anthony Gray, Olmsted Township, OH (US)

(73) Assignee: Sensia Netherlands B.V., The Hague (NL)

( * ) Notice: Subject to any disclaimer, the term of this patent is extended or adjusted under 35 U.S.C. 154(b) by 126 days.

This patent is subject to a terminal disclaimer.

(21) Appl. No.: 16/569,344

(22) Filed: Sep. 12, 2019

(65) Prior Publication Data

US 2020/0003028 A1     Jan. 2, 2020

Related U.S. Application Data

(63) Continuation of application No. 14/312,476, filed on Jun. 23, 2014, now Pat. No. 10,443,357.

(51) Int. Cl.
*G06Q 10/06* (2012.01)
*E21B 41/00* (2006.01)
*E21B 44/00* (2006.01)
*G06F 3/0484* (2013.01)

(52) U.S. Cl.
CPC ....... *G06Q 10/06316* (2013.01); *E21B 41/00* (2013.01); *E21B 41/0092* (2013.01); *E21B 44/00* (2013.01); *G06F 3/0484* (2013.01)

(58) Field of Classification Search
CPC ...... E21B 41/00; E21B 41/0092; E21B 43/00; E21B 43/16; E21B 43/25; E21B 44/00; G05B 15/02; G05D 7/0676; G06F 3/0484; G06F 17/509; G06F 2217/34; G06Q 10/06; G06Q 10/06316; G06Q 10/0633

See application file for complete search history.

(56) References Cited

U.S. PATENT DOCUMENTS

| | | |
|---|---|---|
| 6,985,750 B1 | 1/2006 | Vicknair et al. |
| 8,838,695 B2 | 9/2014 | Foreman et al. |
| 10,062,044 B2 | 8/2018 | Hildebrand et al. |
| 2004/0158568 A1 | 8/2004 | Colle et al. |
| 2012/0254965 A1 | 10/2012 | Parker |
| 2013/0196294 A1 | 8/2013 | Lakshmanaperumal |
| 2013/0211559 A1 | 8/2013 | Lawson et al. |
| 2013/0211870 A1 | 8/2013 | Lawson et al. |
| 2013/0212214 A1 | 8/2013 | Lawson et al. |
| 2013/0217417 A1 | 8/2013 | Mohideen et al. |
| 2013/0290064 A1 | 10/2013 | Altamirano et al. |
| 2013/0290066 A1 | 10/2013 | Altamirano et al. |

(Continued)

*Primary Examiner* — Crystal J Barnes-Bullock
(74) *Attorney, Agent, or Firm* — Foley & Lardner, LLP

(57) ABSTRACT

A method may include receiving, via at least one processor of a cloud-computing system, an indication that a portion of a workflow is complete. Here, the workflow is associated with commissioning one or more well devices at a hydrocarbon site. The method may then include identifying one or more subsequent portions of the workflow to be performed and sending the one or more subsequent portions to one or more computing devices associated with one or more users assigned to the one or more well devices.

20 Claims, 12 Drawing Sheets

(56) References Cited

U.S. PATENT DOCUMENTS

| | | |
|---|---|---|
| 2013/0346754 A1 | 12/2013 | Selman et al. |
| 2014/0047064 A1 | 2/2014 | Maturana et al. |
| 2014/0047107 A1 | 2/2014 | Maturana et al. |
| 2014/0129688 A1 | 5/2014 | Asenjo et al. |
| 2014/0209317 A1 | 7/2014 | Dirksen et al. |
| 2014/0303949 A1 | 10/2014 | Boneti et al. |
| 2015/0284783 A1 | 10/2015 | Canton |
| 2015/0294258 A1 | 10/2015 | Hildebrand et al. |
| 2015/0363738 A1 | 12/2015 | Haci |
| 2016/0188769 A1 | 6/2016 | Aylott et al. |
| 2018/0189702 A1* | 7/2018 | Hunter .................. G06F 30/20 |

\* cited by examiner

SYSTEMS AND METHODS FOR CLOUD-BASED COMMISSIONING OF WELL DEVICES

CROSS-REFERENCE TO RELATED APPLICATION

This application is a continuation of and claims priority to U.S. patent application Ser. No. 14/312,476, entitled "SYSTEMS AND METHODS FOR CLOUD-BASED COMMISSIONING OF WELL DEVICES," filed Jun. 23, 2014, which is herein incorporated by reference in its entirety for all purposes.

BACKGROUND

The present disclosure relates generally to improving operations of a control system that monitors and controls the operation of a well device at a hydrocarbon well site. More specifically, the present disclosure relates to providing cloud-based configuration, analysis, and commissioning services to assist in the operation of a well device at a hydrocarbon well site, control the flow of hydrocarbons from the hydrocarbon well site, and optimize the production of hydrocarbons at the hydrocarbon well site.

As hydrocarbons are extracted from hydrocarbon reservoirs via hydrocarbon wells in oil and/or gas fields, the extracted hydrocarbons may be transported to various types of equipment, tanks, and the like via a network of pipelines. For example, the hydrocarbons may be extracted from the reservoirs via the hydrocarbon wells and may then be transported, via the network of pipelines, from the wells to various processing stations that may perform various phases of hydrocarbon processing to make the produced hydrocarbons available for use or transport.

Information related to the extracted hydrocarbons or related to the equipment extracting, transporting, storing, or processing the extracted hydrocarbons may be gathered at the well site or at various locations along the network of pipelines. This information or data may be used to ensure that the well site or pipelines are operating safely and that the extracted hydrocarbons have certain desired qualities (e.g., flow rate, temperature). The data related to the extracted hydrocarbons may be acquired using monitoring devices that may include sensors that acquire the data and transmitters that transmit the data to computing devices, routers, other monitoring devices, and the like, such that well site personnel and/or off-site personnel may view and analyze the data.

In addition to monitoring the properties of the well device and the hydrocarbon well site, the monitoring devices, such as remote terminal units (RTUs), control the operations of a well device used for extracting hydrocarbons from the hydrocarbon well site. Generally, the RTUs store and execute control programs to effect decision-making in connection with a process for controlling the operation of the well device.

However, given the remote locations in which hydrocarbon well sites are located, operators of the monitoring systems or the RTUs may not have access to technical or operational support to assist with the configuration, commission, operation, or maintenance of an RTU, a well device, or any component that may be part of the hydrocarbon well site. Accordingly, it is now recognized that improved systems and methods for configuring, commissioning, maintaining, and managing various devices at a hydrocarbon well site are desirable.

BRIEF DESCRIPTION

In one embodiment, a method may include receiving, via at least one processor of a cloud-computing system, an indication that a portion of a workflow is complete. Here, the workflow is associated with commissioning one or more well devices at a hydrocarbon site. The method may then include identifying one or more subsequent portions of the workflow to be performed and sending the one or more subsequent portions to one or more computing devices associated with one or more users assigned to the one or more well devices.

In another embodiment, a system may include a cloud-computing system and a display that communicatively couples to at least one processor. The at least one processor may receive a request, via an input to the at least one processor, to commission an operation of a well device that control a flow of hydrocarbons extracted from a hydrocarbon well. The processor may then send identification information associated with the well device to the cloud-computing system upon receiving the request. After sending the identification information, the processor may receive one or more instructions associated with commissioning the operation of the well device from the cloud-computing system. The processor may then depict the instructions on the display.

In yet another embodiment, a non-transitory computer-readable medium may include computer-executable instructions that cause a computing device to receive an indication that a portion of a workflow is complete, such that the workflow is associated with commissioning one or more well devices at a hydrocarbon site. The computing device may then identify one or more subsequent portions of the workflow to be performed and send the one or more subsequent portions to one or more computing devices associated with one or more users assigned to the one or more well devices.

DRAWINGS

These and other features, aspects, and advantages of the present invention will become better understood when the following detailed description is read with reference to the accompanying drawings in which like characters represent like parts throughout the drawings, wherein.

Figure 2:
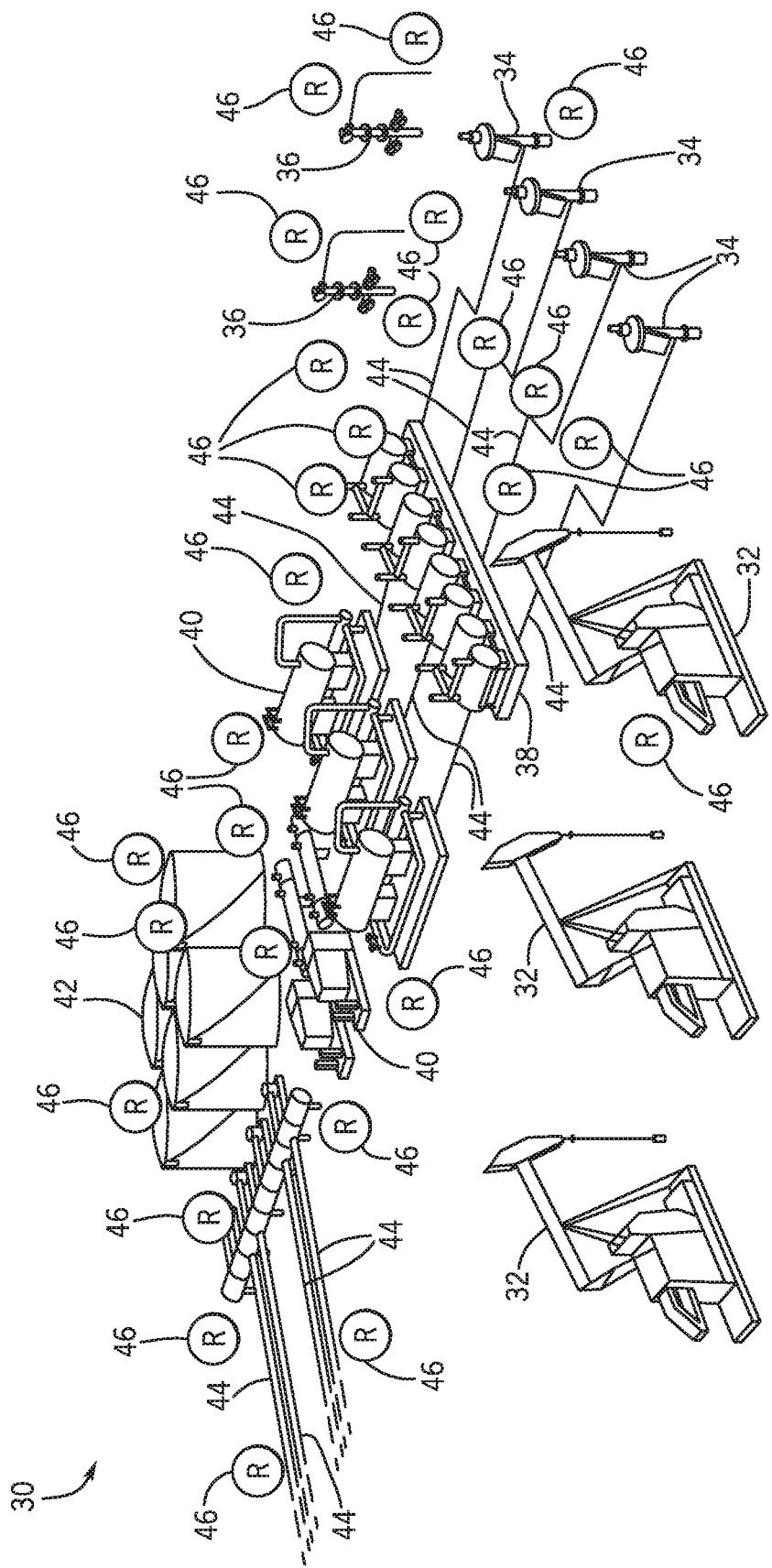
FIG. 2 illustrates a schematic diagram of an example hydrocarbon site that may produce and process hydrocarbons, in accordance with embodiments presented herein.
Figure 16:
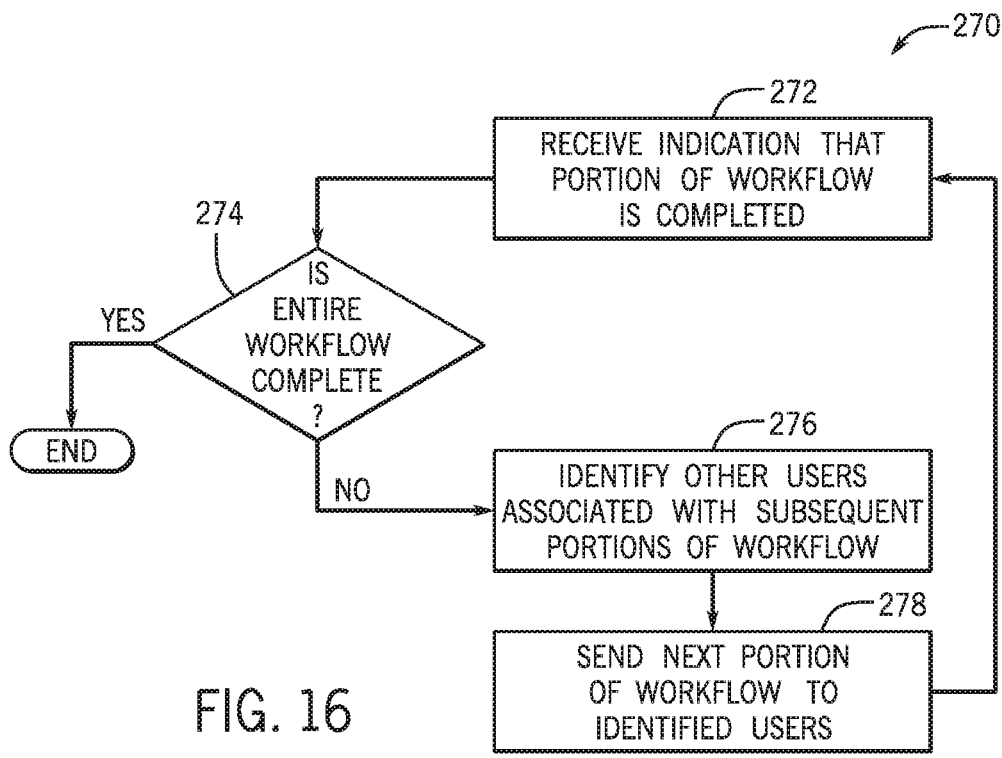
Figure 17:
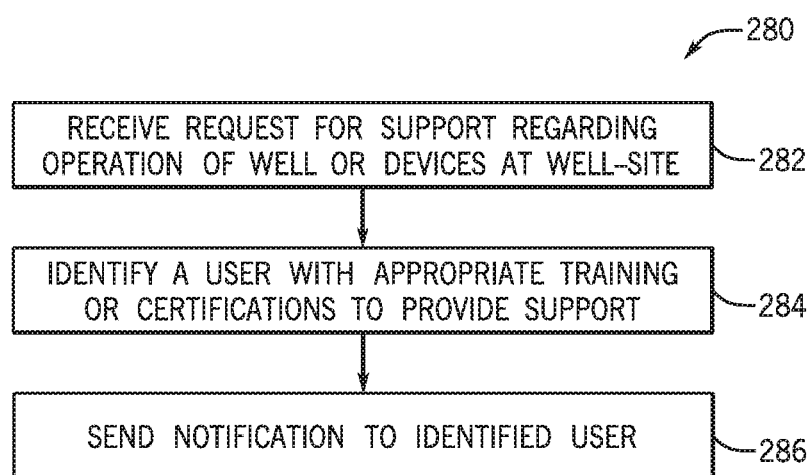

FIG. 16 illustrates a flow chart of a method for distributing a workflow to users at the hydrocarbon site of FIG. 2 using a cloud-based computing system, in accordance with embodiments presented herein; and FIG. 17 illustrates a flow chart of a method for identifying a user to perform a workflow at the hydrocarbon site of FIG. 2 using a cloud-based computing system, in accordance with embodiments presented herein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are generally directed towards improved systems and methods for providing improved systems and methods for configuring, commissioning, operating, maintaining, and managing well devices at a hydrocarbon well site. Moreover, embodiments of the present disclosure are related to leveraging a cloud-based computing network to perform various operations at a hydrocarbon well site more efficiently.

Generally, when initializing a component, such as a remote terminal unit (RTU), at a hydrocarbon well site, a user may configure the RTU such that the RTU operates according to a desired function. However, the user may not be familiar with various ways in which the RTU may be configured to operate. For instance, the operation of the RTU may be dependent on a type of hydrocarbon well that the component may be associated with, a type of well devices that the RTU may be controlling, and the like. Moreover, the user may not have access to latest versions of firmware and/or software that may enable the RTU to operate more efficiently. As such, in certain embodiments, the RTU may automatically connect to a cloud-based computing system that may automatically configure the RTU and automatically initialize the operation of the RTU based on information received from the RTU itself. Upon sending configuration data to the RTU, the cloud-based computing system may store a profile associated with the respective RTU that includes details regarding the configuration of the RTU. If the RTU is replaced, the cloud-based computing system may retrieve the profile of the previous RTU and send the configuration of the previous RTU to the replacement RTU, thereby maintaining the operation of the RTU.

In addition to providing assistance in initializing the RTU, the cloud-based computing system may also provide various analysis services with respect to data acquired by the RTUs at the hydrocarbon well site. Generally, during hydrocarbon exploitation operations, well site personnel often encounter numerous challenges when attempting to optimize or increase the production of hydrocarbons at the hydrocarbon well site. For instance, complex information presented in raw data form may take time before it may be assimilated and understood by a well site operator, such that the operator is capable of making accurate decisions with regard to operating a well at the well site. As such, in certain embodiments, the cloud-based computing system may analyze the data acquired by the RTU at the hydrocarbon well site and provide recommendations concerning how to control the operations of well devices at the well site based on the analysis. By leveraging the computing power of the cloud-based computing system, the RTU may be equipped to improve the production of the hydrocarbon well more quickly, as compared to using the computing power of a single RTU. In certain embodiments, the cloud-based computing system may analyze the collected data from the hydrocarbon well site with respect to data associated with a number of other hydrocarbon well sites. As such, using all of the data acquired at the hydrocarbon well sites, the cloud-based computing system may generate analysis that may predict the production of the hydrocarbon well site based on the production properties for each well at the other hydrocarbon well sites.

Keeping the foregoing in mind, in certain embodiments, the cloud-based computing system may monitor various properties associated with a respective well at the hydrocarbon well site, analyze the monitored properties, and provide certain data analysis and/or visualizations (e.g., plots) to the RTU or to a computing device (e.g., mobile phone) that may assist a well operator to control various operating parameters of the respective well. As a result, the user may receive real time or near real time analysis of data associated with the respective well at the hydrocarbon well site. In addition, the cloud-based computing system may send commands to the RTU to automatically adjust certain operating parameters of the respective well based on the data analysis. In this manner, the operating parameters of the respective well may be modified in real time or near real time to ensure that the hydrocarbons at the respective well are being efficiently produced.

In addition to the aforementioned features of the cloud-based computing system, the cloud-based computing system may also provide operational and technical support to the user of the RTU to facilitate the commissioning of a well device or a collection of well devices, the operation of the well device or the collection of well devices, the maintenance of the well device or the collection of well devices, or the like. That is, the cloud-based computing system may have access to a large amount of data that may include commissioning instructions or workflows for various different types of well devices. Moreover, as new commissioning processes or troubleshooting processes are generated, the instructions related to the new processes may be stored and categorized using a database and a database management system accessible by the cloud-based computing system. In this manner, the cloud-based computing system serve as a hub for information related to various operations related to the hydrocarbon well site. Moreover, the cloud-based computing system may distribute portions of workflows for commissioning a well device or a collection of well devices among a number of users involved in the commissioning process. Additional details regarding the above mentioned embodiments, as well as details regarding additional embodiments for improving the operations of well devices at the hydrocarbon well site, will be discussed in detail below with reference to FIGS. 1-17.

Cloud-Based Computing System

Figure 1:
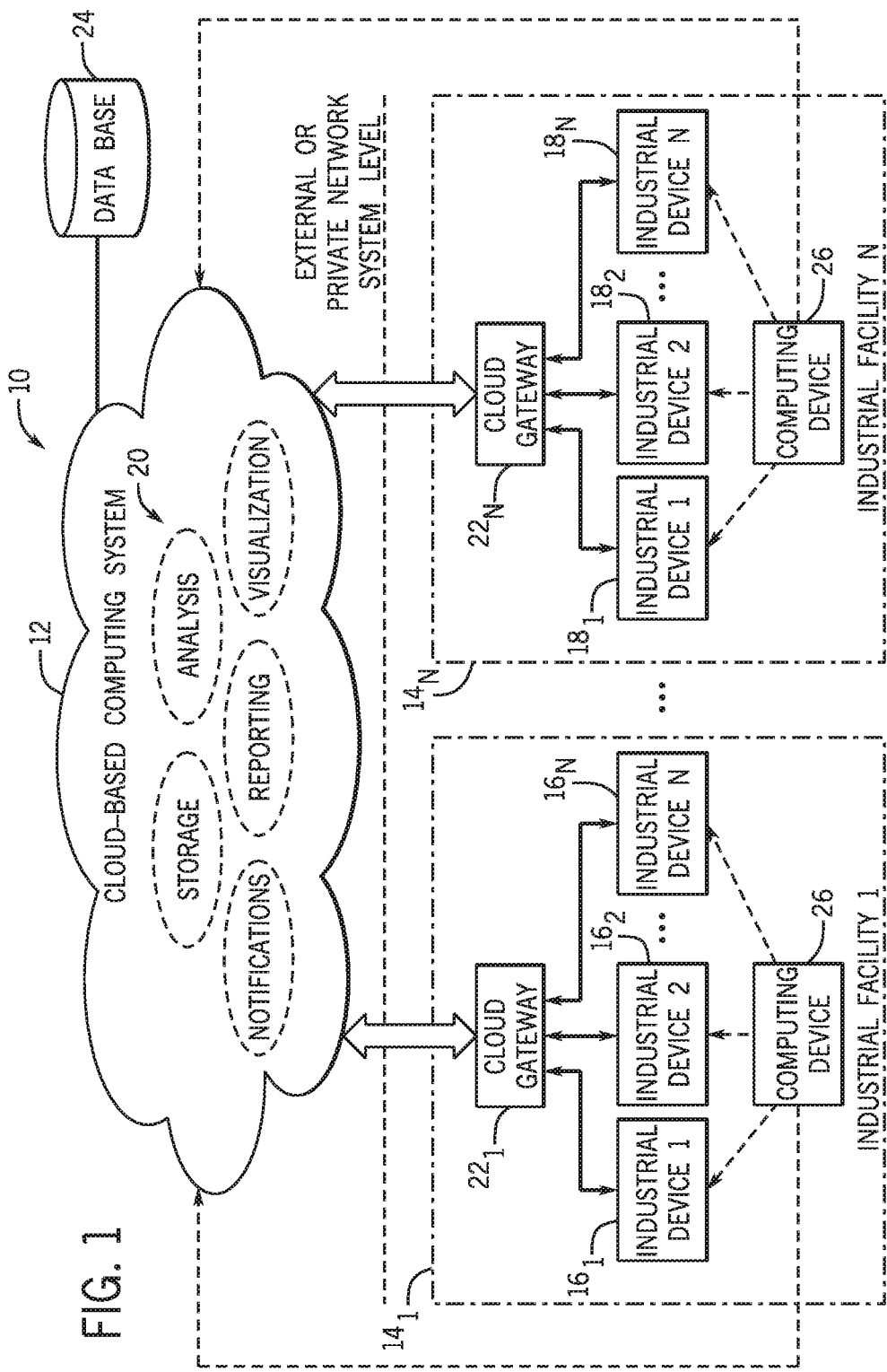
FIG. 1 illustrates a block diagram of a high-level overview of an industrial enterprise that leverages a cloud-based computing system, in accordance with embodiments presented herein.

By way of introduction, FIG. 1 illustrates a high-level overview of an industrial enterprise 10 that leverages a cloud-based computing system to improve the operations of various industrial devices. The enterprise 10 may include one or more industrial facilities 14, each having a number of industrial devices 16 and 18 in use. The industrial devices 16 and 18 may make up one or more automation systems operating within the respective facilities 14. Exemplary automation systems may include, but are not limited to, batch control systems (e.g., mixing systems), continuous control systems (e.g., proportional-integral-derivative (PID) control systems), or discrete control systems. Industrial devices 16 and 18 may also include devices, such as industrial controllers (e.g., programmable logic controllers or other types of programmable automation controllers), field devices such as sensors and meters, motor drives, operator interfaces (e.g., human-machine interfaces, industrial monitors, graphic terminals, message displays, etc.), industrial robots, barcode markers and readers, vision system devices (e.g., vision cameras), smart welders, or other such industrial devices.

In certain embodiments, the industrial devices 16 and 18 may communicatively couple to a computing device 26. The communication link between the industrial devices 16 and 18 and the computing device 26 may be a wired or a wireless connection, such as Wi-Fi®, Bluetooth®, and the like. Generally, the computing device 26 may be any type of processing device that may include communication abilities, processing abilities, and the like. For example, the computing device 26 may be a controller, such as a programmable logic controller (PLC), a programmable automation controller (PAC), or any other controller that may monitor, control, and operate the industrial device 16 and 18. The computing device 26 may be incorporated into any physical device (e.g., the industrial device 16 and 18) or may be implemented as a stand-alone computing device (e.g., general purpose computer), such as a desktop computer, a laptop computer, a tablet computer, a mobile computing device, or the like.

In addition to communicating with the industrial devices 16 and 18, the computing device 26 may also establish a communication link with the cloud-based computing system 12. As such, the computing system 26 may have access to a number of cloud-based services provided by the cloud-based computing system 12, as will be described in more detail below. Generally, the computing device 26 may send and receive data to and from the cloud-based computing system 12 to assist a user of the industrial device 16 or 18 in the commissioning, operation, and maintenance of the industrial automation systems.

Exemplary automation systems can include one or more industrial controllers that facilitate monitoring and control of their respective processes. The controllers may exchange data with the field devices using native hardwired I/O or via a plant network such as Ethernet/IP, Data Highway Plus, ControlNet, DeviceNet, or the like. A given controller may receive any combination of digital or analog signals from the field devices indicating a current state of the devices and their associated processes (e.g., temperature, position, part presence or absence, fluid level, etc.), and executes a user-defined control program that performs automated decision-making for the controlled processes based on the received signals. The controller may then output appropriate digital and/or analog control signaling to the field devices in accordance with the decisions made by the control program. These outputs may include device actuation signals, temperature or position control signals, operational commands to a machining or material handling robot, mixer control signals, motion control signals, and the like. The control program may include any suitable type of code used to process input signals read into the controller and to control output signals generated by the controller, including but not limited to ladder logic, sequential function charts, function block diagrams, structured text, or other such platforms.

Although the industrial enterprise 10 illustrated in FIG. 1 depicts the industrial devices 16 and 18 as residing in fixed-location industrial facilities 14, the industrial devices 16 and 18 may also be part of a mobile control application, such as a system contained in a truck or other service vehicle. Additionally, although the industrial enterprise 10 of FIG. 1 is described with respect to automation systems, it should be noted that the industrial enterprise 10 described herein may be applied to other industrial environments, such as hydrocarbon production well sites, as will be detailed below.

In certain embodiments, the industrial devices 16 and 18 may be communicatively coupled to the cloud-based computing system 12 that may provide various applications, analysis operations, and access to data that may be unavailable to the industrial devices 16 and 18. That is, the industrial device 16 and 18 may interact with the cloud-based computing system 12, such that the industrial device 16 and 18 may use various cloud-based services 20 to perform its respective operations more efficiently or effectively. The cloud-based computing system 12 may be any infrastructure that enables the cloud-based services 20 to be accessed and utilized by cloud-capable devices. In one embodiment, the cloud-based computing system 12 may include a number of computers that may be connected through a real-time communication network, such as the Internet, Ethernet/IP, ControlNet, or the like. By employing a number of computers, the cloud-based computing system 12 may distribute large-scale analysis operations over the number of computers that make up the cloud-based computing system 12.

Generally, the computers or computing devices provided by the cloud-based computing system 12 may be dedicated to performing various types of complex and time-consuming analysis that may include analyzing a large amount of data. As a result, the industrial device 16 or 18 may continue its respective processing operations without performing additional processing or analysis operations that may involve analyzing large amounts of data collected from other data sources.

In certain embodiments, the cloud-based computing system 12 may be a public cloud accessible via the Internet by devices having Internet connectivity and appropriate authorizations to utilize the cloud-based services 20. In some scenarios, the cloud-based computing system 12 may be a platform-as-a-service (PaaS), and the cloud-based services 20 may reside and execute on the cloud-based computing system 12.

In certain instances, access to cloud-based computing system 12 may be provided to users as a subscription service by an owner of the respective cloud-based services 20. Alternatively, the cloud-based computing system 12 may be a private network of computers operated internally by the enterprise 10. For example, the cloud-based computing system 12 may involve a set of servers hosting the cloud-based services 20 and residing on an internal network protected by a firewall.

The cloud-based services 20 may include, but are not limited to, data storage, data analysis, control applications (e.g., applications that can generate and deliver control instructions to industrial devices 16 and 18 based on analysis of near real-time system data or other factors), visualization applications such as the cloud-based operator interface system, reporting applications, Enterprise Resource Planning (ERP) applications, notification services, or other such applications. If the cloud-based computing system 12 is a web-based system, industrial devices 16 and 18 at the respective industrial facilities 14 may interact with cloud-based services 20 directly or via the Internet. Alternatively or additionally, the industrial devices 16 and 18 may access the cloud-based computing system 12 through separate cloud gateways 22 at the respective industrial facilities 14. Here, the industrial devices 16 and 18 may connect to the cloud gateways 22 via a wired or wireless communication link. In one embodiment, the industrial devices 16 and 18 may access the cloud-based computing system 12 directly using an integrated cloud interface.

In certain embodiments, the cloud-based computing system 12 may also be communicatively coupled to a database 24 that may store data related to the industrial device 16 and 18, data acquired by the industrial device 16 and 18, historical data associated with the industrial facility 14, and the like. The cloud-based computing system 12 may use the data stored within the database 24 to perform various types of data analyses, as will be discussed in greater detail below.

By providing the industrial devices 16 and 18 with access to the cloud-based computing system 12, the industrial enterprise 10 may leverage the computing power of the cloud-based computing system 12 to analyze data acquired from a number of industrial devices 16 and 18, perform more comprehensive data analyses more efficiently, and provide the user of the industrial devices 16 and 18 access to additional information and operational support to more efficiently manage the operations of the industrial enterprise 10. For instance, the cloud-based computing system 12 may provide cloud-based storage that may be scaled to accommodate large quantities of data generated and acquired by the various devices in the industrial enterprise 10. Moreover, multiple industrial facilities 14 at different geographical locations may migrate their respective data to the cloud-based computing system 12 for aggregation, collation, collective analysis, and enterprise-level reporting without establishing a private network between the facilities. In certain embodiments, the industrial devices 16 and 18 may include a configuration capability to automatically detect and communicate with the cloud-based computing system 12 upon installation at any facility, simplifying integration with the cloud-based computing system 12. In another embodiment, the cloud-based computing system 12 may include diagnostic applications that may monitor the health of respective automation systems or their associated industrial devices across an entire plant, or across multiple industrial facilities that make up the enterprise 10. Additionally, the cloud-based computing system 12 may include cloud-based lot control applications that may track a unit of product through its stages of production and collect production data for each unit as it passes through each stage (e.g., barcode identifier, production statistics for each stage of production, quality test data, abnormal flags, etc.). It should be noted that these industrial cloud-computing applications are provided as examples, and the systems and methods described herein are not limited to these particular applications.

As mentioned above, the cloud-based computing system 12 may also be implemented in other industrial environments such as a hydrocarbon well site, and the like. Keeping this in mind, FIG. 2 illustrates a schematic diagram of an example hydrocarbon site 30 that may employ the cloud-based computing system 12 to assist in the commission, operation, and maintenance of various well devices at the hydrocarbon site 30.

Referring now to FIG. 2, the hydrocarbon site 30 may be an area in which hydrocarbons, such as crude oil and natural gas, may be extracted from the ground, processed, and stored. As such, the hydrocarbon site 30 may include a number of wells and a number of well devices that may control the flow of hydrocarbons being extracted from the wells. In one embodiment, the well devices at the hydrocarbon site 30 may include any device equipped to monitor and/or control production of hydrocarbons at a well site. As such, the well devices may include pumpjacks 32, submersible pumps 34, well trees 36, and the like. After the hydrocarbons are extracted from the surface via the well devices, the extracted hydrocarbons may be distributed to other devices such as wellhead distribution manifolds 38, separators 40, storage tanks 42, and the like. At the hydrocarbon site 30, the pumpjacks 32, submersible pumps 34, well trees 36, wellhead distribution manifolds 38, separators 40, and storage tanks 42 may be connected together via a network of pipelines 44. As such, hydrocarbons extracted from a reservoir may be transported to various locations at the hydrocarbon site 30 via the network of pipelines 44.

The pumpjack 32 may mechanically lift hydrocarbons (e.g., oil) out of a well when a bottom hole pressure of the well is not sufficient to extract the hydrocarbons to the surface. The submersible pump 34 may be an assembly that may be submerged in a hydrocarbon liquid that may be pumped. As such, the submersible pump 34 may include a hermetically sealed motor, such that liquids may not penetrate the seal into the motor. Further, the hermetically sealed motor may push hydrocarbons from underground areas or the reservoir to the surface.

The well trees 36 or Christmas trees may be an assembly of valves, spools, and fittings used for natural flowing wells. As such, the well trees 36 may be used for an oil well, gas well, water injection well, water disposal well, gas injection well, condensate well, and the like. The wellhead distribution manifolds 38 may collect the hydrocarbons that may have been extracted by the pumpjacks 32, the submersible pumps 34, and the well trees 36, such that the collected hydrocarbons may be routed to various hydrocarbon processing or storage areas in the hydrocarbon site 30.

The separator 40 may include a pressure vessel that may separate well fluids produced from oil and gas wells into separate gas and liquid components. For example, the separator 40 may separate hydrocarbons extracted by the pumpjacks 32, the submersible pumps 34, or the well trees 36 into oil components, gas components, and water components. After the hydrocarbons have been separated, each separated component may be stored in a particular storage tank 42. The hydrocarbons stored in the storage tanks 42 may be transported via the pipelines 44 to transport vehicles, refineries, and the like.

The well devices may also include monitoring systems that may be placed at various locations in the hydrocarbon site 30 to monitor or provide information related to certain aspects of the hydrocarbon site 30. As such, the monitoring system may be a controller, a remote terminal unit (RTU), or any computing device that may include communication abilities, processing abilities, and the like. For discussion purposes, the monitoring system will be embodied as the RTU 46 throughout the present disclosure. However, it should be understood that the RTU 46 may be any component capable of monitoring and/or controlling various components at the hydrocarbon site 30.

The RTU 46 may include sensors or may be coupled to various sensors that may monitor various properties associated with a component at the hydrocarbon site 10. The RTU 46 may then analyze the various properties associated with the component and may control various operational parameters of the component. For example, the RTU 46 may measure a pressure or a differential pressure of a well or a component (e.g., storage tank 42) in the hydrocarbon site 30. The RTU 46 may also measure a temperature of contents stored inside a component in the hydrocarbon site 30, an amount of hydrocarbons being processed or extracted by components in the hydrocarbon site 30, and the like. The RTU 46 may also measure a level or amount of hydrocarbons stored in a component, such as the storage tank 42. In certain embodiments, the RTU 46 may be iSens-GP Pressure Transmitter, iSens-DP Differential Pressure Transmitter, iSens-MV Multivariable Transmitter, iSens-T2 Temperature Transmitter, iSens-L Level Transmitter, or Isens-IO Flexible I/O Transmitter manufactured by vMonitor® of Houston, Tex.

In one embodiment, the RTU 46 may include a sensor that may measure pressure, temperature, fill level, flow rates, and the like. The RTU 46 may also include a transmitter, such as a radio wave transmitter, that may transmit data acquired by the sensor via an antenna or the like. The sensor in the RTU 46 may be wireless sensors that may be capable of receive and sending data signals between RTUs 26. To power the sensors and the transmitters, the RTU 46 may include a battery or may be coupled to a continuous power supply. Since the RTU 46 may be installed in harsh outdoor and/or explosion-hazardous environments, the RTU 46 may be enclosed in an explosion-proof container that may meet certain standards established by the National Electrical Manufacturer Association (NEMA) and the like, such as a NEMA 4×container, a NEMA 7×container, and the like.

The RTU 46 may transmit data acquired by the sensor or data processed by a processor to other monitoring systems, a router device, a supervisory control and data acquisition (SCADA) device, or the like. As such, the RTU 46 may enable users to monitor various properties of various components in the hydrocarbon site 30 without being physically located near the corresponding components.

In operation, the RTU 46 may receive real-time or near real-time data associated with a well device. The data may include, for example, tubing head pressure, tubing head temperature, case head pressure, flowline pressure, wellhead pressure, wellhead temperature, and the like. In any case, the RTU 46 may analyze the real-time data with respect to static data that may be stored in a memory of the RTU 46. The static data may include a well depth, a tubing length, a tubing size, a choke size, a reservoir pressure, a bottom hole temperature, well test data, fluid properties of the hydrocarbons being extracted, and the like. The RTU 46 may also analyze the real-time data with respect to other data acquired by various types of instruments (e.g., water cut meter, multiphase meter) to determine an inflow performance relationship (IPR) curve, a desired operating point for the wellhead 30, key performance indicators (KPIs) associated with the wellhead 30, wellhead performance summary reports, and the like. Although the RTU 46 may be capable of performing the above-referenced analyses, the RTU 46 may not be capable of performing the analyses in a timely manner. Moreover, by just relying on the processor capabilities of the RTU 46, the RTU 46 is limited in the amount and types of analyses that it may perform. Moreover, since the RTU 46 may be limited in size, the data storage abilities may also be limited.

Keeping the foregoing in mind, in certain embodiments, the RTU 46 may establish a communication link with the cloud-based computing system 12 described above. As such, the cloud-based computing system 12 may use its larger processing capabilities to analyze data acquired by multiple RTUs 26. Moreover, the cloud-based computing system 12 may access historical data associated with the respective RTU 46, data associated with well devices associated with the respective RTU 46, data associated with the hydrocarbon site 30 associated with the respective RTU 46 and the like to further analyze the data acquired by the RTU 46.

Figure 3:
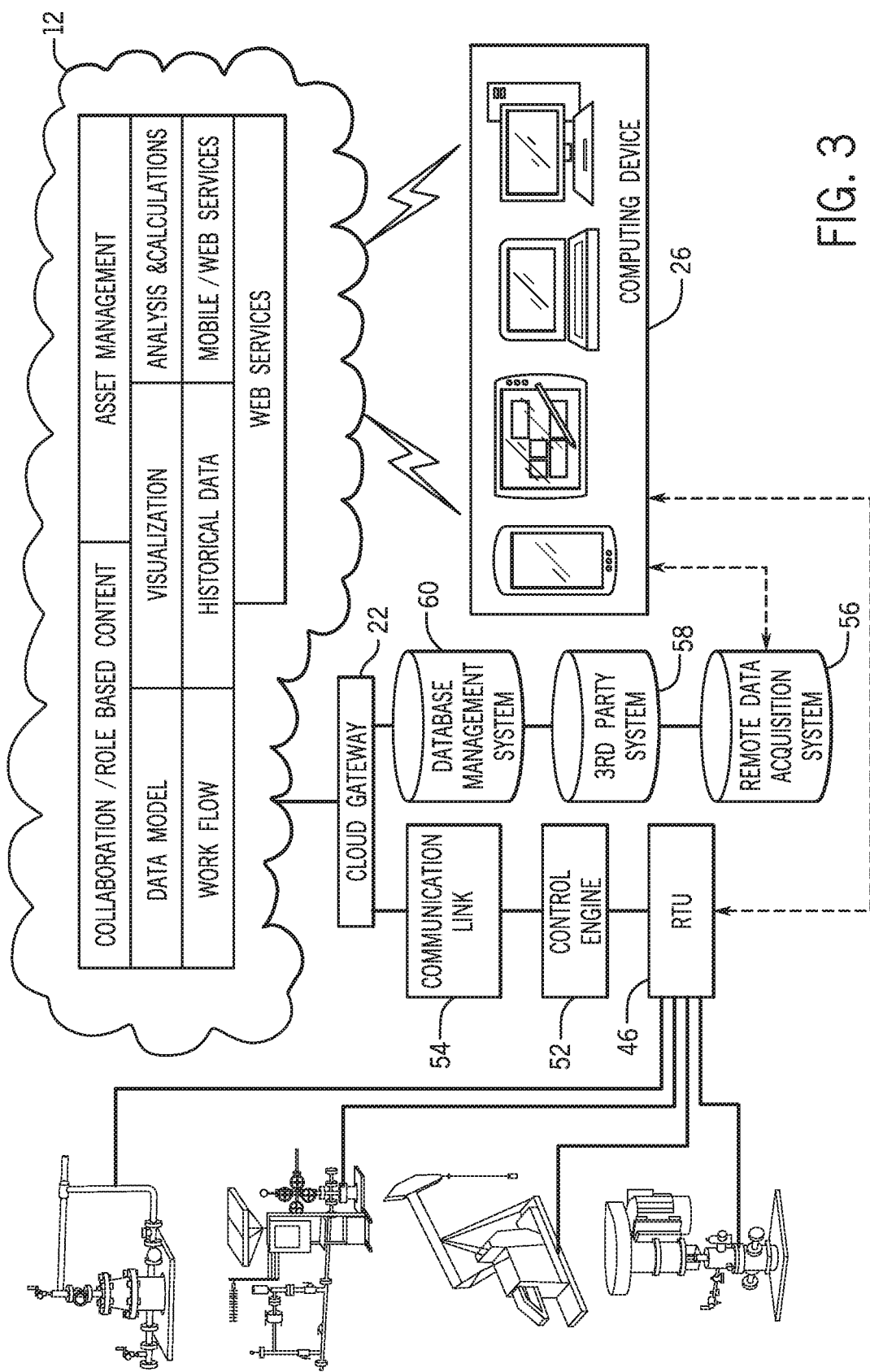
FIG. 3 illustrates an example overview of a cloud-based communication architecture for the example hydrocarbon site of FIG. 2, in accordance with embodiments presented herein.

Accordingly, in one embodiment, the RTU 46 may communicatively couple to the cloud-based computing system 26 via a cloud-based communication architecture 20 as shown in FIG. 3. Referring to FIG. 3, the RTU 46 may communicatively couple to a control engine 52 such as ControlLogix® or the like. The control engine 52 may, in turn, communicatively couple to a communication link 54 that may provide a protocol or specifications such as OPC Data Access that may enable the control engine 52 and the RTU 46 to continuously communicate its data to the cloud-based computing device 26. The communication link 54 may be communicatively coupled to the cloud gateway 22, which may then provide the control engine 52 and the RTU 46 access to communicate with the cloud-based computing device 12. Although the RTU 46 is described as communicating with the cloud-based computing device 12 via the control engine 52 and the communication link 54, it should be noted that in some embodiments, the RTU 46 may communicate directly with the cloud gateway 22 like the industrial device 16 and 18 of FIG. 1 or may communicate directly with the cloud-based computing device 12.

In some embodiments, the RTU 26 may communicatively couple to the control engine 52 or the communication link 54 via an Ethernet IP/Modbus network. As such, a polling engine may connect to the RTU 26 via the Ethernet IP/Modbus network to poll the data acquired by the RTU 26. The polling engine may then use an Ethernet network to connect to the cloud-based computing system 12.

As mentioned above, the RTU 46 may monitor and control various types of well devices and may send the data acquired by the respective well devices to the cloud-based computing system 12 according to the architecture described above. For example, as shown in FIG. 3, the RTU 46 may monitor and control an electrical submersible pump (ESP), a gas lift (GL), a rod pump controller (RPC), a progressive cavity pump (PCP), and the like. In the ESP, the RTU 46 may sense and control the wellhead and other operating variables of the ESP system. In the GL, the RTU 46 may adjust a gas lift injection flow to operator flow rate, compute real-time estimated gas-oil-water production, and the like. In the RPC, the RTU 46 may provide advance rod pump controlling operations for beam pump applications and the like. The RTU 46 may also monitor both polish rod load and continuous walking beam position to develop dynamometer cards. In the PCP, the RTU 46 may provide local and remote monitoring of the wellhead and other PCP variable. Here, the RTU 46 may also perform basic analysis and adjust the pumping conditions of the PCP based on the received data from the PCP.

In addition to the RTU 46 and the control engine 52 being able to communicate with the cloud-based computing system 12, remote data acquisition systems 56, third party systems 58, and database management systems 60 may also communicatively couple to the cloud gateway 22. The remote data acquisition systems 56 may acquire real-time data transmitted by various data sources such as the RTU 46 and other third party systems 58. The database management system 60 may be a relational database management system that stores and retrieves data as requested by various software applications. By way of example, the database management system 60 may be a SQL server, an ORACLE server, a SAP server, or the like.

As mentioned above, the computing device 26 may communicatively couple to the RTU 46 and the cloud-based computing system 12. As shown in FIG. 3, the computing device 26 may include a mobile device, a tablet device, a laptop, a general purpose computer, or the like. In certain embodiments, the computing device 26 may also communicatively couple with the remote data acquisition systems 56, the third party system 58, and the database management system 60. By communicating with all of these types of devices, the computing device 26 may receive data and generate visualizations associated with each respective device, thereby providing the user of the computing device 26 a more efficient manner in which to view and analyze the data. Moreover, since the computing device 26 may receive data from the cloud-based computing system 12, the computing device 26 may receive visualizations and data related to various types of analyses and cloud services 20 provided by the cloud-based computing system 12.

In some embodiments, the cloud-based computing system 12 may include applications related to collaboration or role based content, asset management, data models, visualizations, analysis & calculations, workflows, historical data, mobile web services, web services, and the like. The collaboration or role-based application may include facilitating collaboration between various users of the cloud-based computing system 12 to assist in the commission, operation, or maintenance of well devices at the hydrocarbon site 30. The asset management application may track the hardware and software maintenance of the well devices and the software used therein. The data model application may include algorithms that may simulate various types of data related to the production of hydrocarbons by a well device, the production of hydrocarbons at a hydrocarbon site, and the like based on various process parameter inputs received by the cloud-based computing system 12. The visualization application may generate various types of visualizations such as graphs, tables, data dashboards, and the like based on the data received by the cloud-based computing system 12 and the data available to the cloud-based computing system 12 via the database 24 or the like.

The analysis & calculations applications may include software applications that may provide additional information regarding the data received by the cloud-based computing system 12. For example, the analysis & calculations applications may analyze flow rate data regarding the production of hydrocarbons by a particular well site to determine the amount of hydrocarbons, water, and sand (i.e., multiphase measurements) contained in the produced hydrocarbons.

The workflow applications may be software applications that generate workflows or instructions for users of the well device or personnel at the hydrocarbon site 30 may use to perform their respective tasks. In one example, the cloud-based computing system 12 may generate a workflow regarding the commissioning of a well device, troubleshooting an operation issue with a well device, or the like.

In certain embodiments, the workflow applications may determine the workflows based on historical data stored within the cloud-based computing system 12. That is, the historical data may include data related to previous items produced by any application within the cloud-based computing system 12 such as workflows, data analyses, reports, visualizations, and the like. Moreover, the historical data may also include raw data acquired by the RTU 46 or any other device and received by the cloud-based computing system 12. As such, the cloud-based computing system 12 may use the historical data to perform additional analyses on the received data, simulate or predict how the operations of a well device may change, simulate how the production of hydrocarbons at a well site may change, and the like.

The cloud-based computing system 12 may also provide mobile web services and web services that may enable the computing device 26, or any other device communicatively coupled to the cloud-based computing system 12, to access the Internet, Intranet, or any other network that may be available. Moreover, the cloud-based computing system 12 may use the web services to access information related to various analyses that it may be performing and the like.

Figure 4:
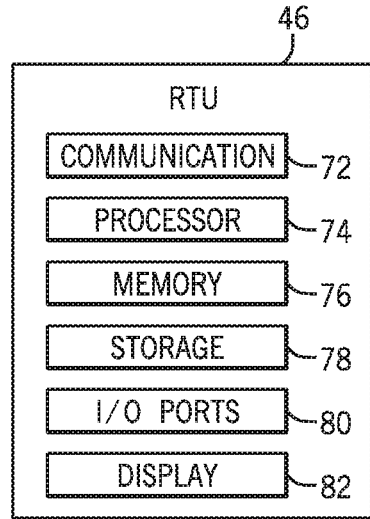
FIG. 4 illustrates a block diagram of a remote terminal unit (RTU) that may be employed in the cloud-based communication architecture of FIG. 3, in accordance with embodiments presented herein.

Referring back to the RTU 46, FIG. 4 illustrates a block diagram of various components that may be part of the RTU 46 and may be used by the RTU 46 to perform various analysis operations. As shown in FIG. 4, the RTU 46 may include a communication component 72, a processor 74, a memory 76, a storage 78, input/output (I/O) ports 80, a display 82, and the like. The communication component 72 may be a wireless or wired communication component that may facilitate communication between different RTUs 46, gateway communication devices, various control systems, and the like. The processor 74 may be any type of computer processor or microprocessor capable of executing computer-executable code. The memory 76 and the storage 78 may be any suitable articles of manufacture that can serve as media to store processor-executable code, data, or the like. These articles of manufacture may represent computer-readable media (i.e., any suitable form of memory or storage) that may store the processor-executable code used by the processor 74 to perform the presently disclosed techniques. The memory 76 and the storage 78 may also be used to store data received via the I/O ports 80, data analyzed by the processor 74, or the like.

The I/O ports 80 may be interfaces that may couple to various types of I/O modules such as sensors, programmable logic controllers (PLC), and other types of equipment. For example, the I/O ports 80 may serve as an interface to pressure sensors, flow sensors, temperature sensors, and the like. As such, the RTU 46 may receive data associated with a well via the I/O ports 80. The I/O ports 80 may also serve as an interface to enable the RTU 46 to connect and communicate with surface instrumentation, flow meters, water cut meters, multiphase meters, and the like.

In addition to receiving data via the I/O ports 80, the RTU 46 may control various devices via the I/O ports 80. For example, the RTU 46 may be communicatively coupled to an actuator or motor that may modify the size of a choke that may be part of the well. The choke may control a fluid flow rate of the hydrocarbons being extracted at the well or a downstream system pressure within the network of pipelines 44 or the like. In one embodiment, the choke may be an adjustable choke that may receive commands from the RTU 46 to change the fluid flow and pressure parameters at the well.

The display 82 may include any type of electronic display such as a liquid crystal display, a light-emitting-diode display, and the like. As such, data acquired via the I/O ports and/or data analyzed by the processor 74 may be presented on the display 82, such that operators having access to the RTU 46 may view the acquired data or analyzed data at the hydrocarbon well site. In certain embodiments, the display 82 may be a touch screen display or any other type of display capable of receiving inputs from the operator.

Figure 5:
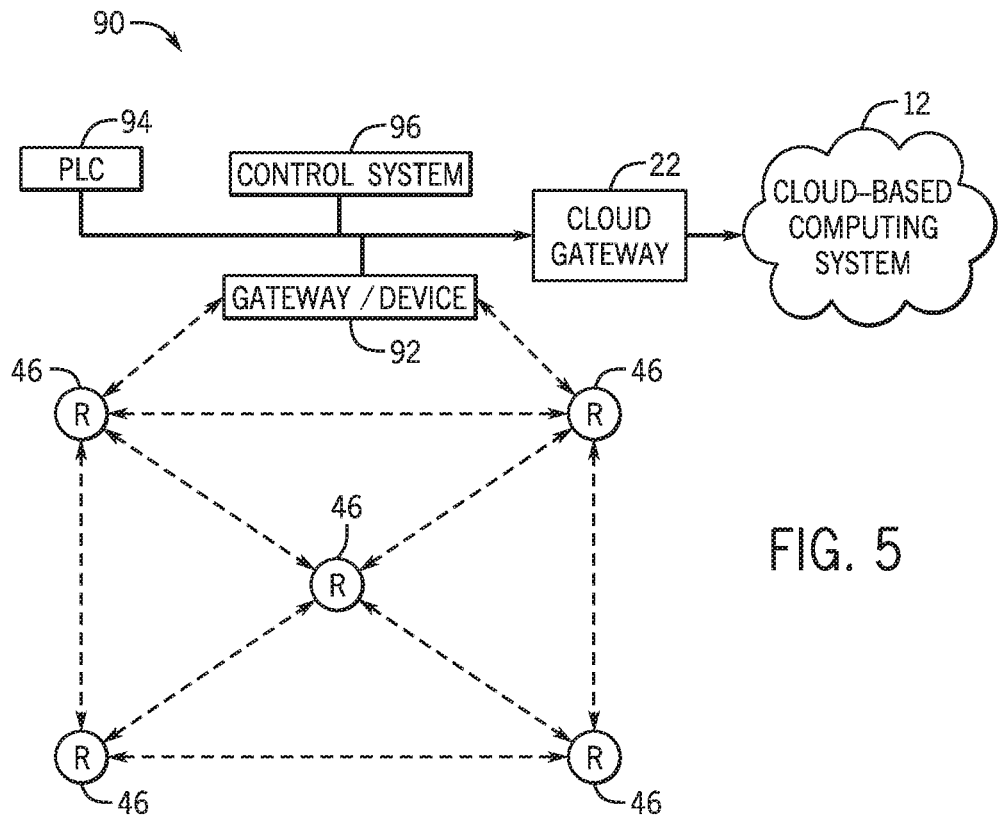
FIG. 5 illustrates a communication network that may be employed in the hydrocarbon site of FIG. 2, in accordance with embodiments presented herein.

Referring back to the communication component 72, the RTU 46 may use the communication component 72 to communicatively couple to various devices in the hydrocarbon site 30 and to the cloud-based computing system 12. FIG. 5, for instance, illustrates an example communication network 90 that may be employed in the hydrocarbon site 30. As shown in FIG. 5, each RTU 46 may be communicating with one or more other RTUs 46. That is, each RTU 46 may communicate with certain RTUs 46 that may be located within some range of the respective RTU 46. Each RTU 46 may communicate with each other via its respective communication component 72. As such, each RTU 46 may transfer raw data acquired at its respective location, analyzed data associated with a respective well, or the like to each other. In one embodiment, the RTUs 46 may route the data to a gateway device 92. The gateway device 92 may be a network device that may communicate with other networks or devices that may use different communication protocols. As such, the gateway device 92 may include similar components as the RTU 46. However, since the gateway device 92 may not be located at the well site or coupled to a well device, the gateway device 92 may have a larger form factor as compared to the RTU 46. Additionally, since the gateway device 92 may receive and process data acquired from multiple RTUs 46, the gateway device 92 may use a larger battery or power source as compared to the RTU 46 to process the additional data. In this manner, the gateway device 92 may also include a larger and/or faster processor 74, a larger memory 76, and a larger storage 78, as compared to the RTU 46.

After receiving data from the RTUs 46, the gateway device 72 may provide the data from each RTU 46 to various types of devices, such as a programmable logic controller (PLC) 94, a control system 96, and the like. The PLC 94 may include a digital computer that may control various components or machines in the hydrocarbon site 30. The control system 96 may include a computer-controlled system that monitors the data received via the RTUs 46 and may and control various components in the hydrocarbon site 30 and various processes performed on the extracted hydrocarbons by the components. For example, the control system 96 may be a supervisory control and data acquisition (SCADA), which may control large-scale processes, such as industrial, infrastructure, and facility-based processes, that may include multiple hydrocarbon sites 30 separated by large distances.

The gateway device 92 may also be coupled to the cloud gateway 22 mentioned above. As such, the gateway device 92 may also provide the RTUs 46 access to communicate with the cloud-based computing system 12 via the cloud gateway 22.

Although FIGS. 3 and 4 illustrate how the RTU 46 may communicatively couple to the cloud-based computing system 12, it should be noted that the RTU 46 may also operate in an environment that does not have access to the cloud-based computing system 12. That is, in some embodiments, the RTU 46 may operate in an environment that may have a data processing facility located within a particular range of the RTU 46 or within a range of a communication network accessible by the RTU 46 or the gateway device 92. As such, the data processing facility may provide similar services as described above with respect to the cloud-based computing system 12. For example, the data processing facility may be provide applications and services manufactured by Rockwell Automation® such as FactoryTalk AssetCenter, FactoryTalk VantagePoint, FactoryTalk View SE, FactoryTalk Historian, VantagePoint Connectors, FactoryTalk Live Data, FactoryTalk VantagePoint JSON Web Services, as well as the services provided by the cloud-based computing system 12.

In certain embodiments, each RTU 46 may acquire data from various sensors disposed throughout a respective well, the hydrocarbon well site 30, and the like. To enable well site personnel (i.e., operators physically located at the well site) to determine that the well is operating efficiently, the RTU 46 may perform some initial data analysis using the processor 74 and may output the results of the data analysis via the display 82. In certain embodiments, the monitoring device 26 may transmit the results of the data analysis to the computing device 26, which may be a handheld electronic device (e.g., mobile phone, tablet computer, laptop computer, etc.) via the communication component 72 using a communication protocol, such as Bluetooth® or any other wireless or wired protocol. After receiving the results of the data analysis via the display 82 or the handheld electronic device, the operator may modify various operating parameters of the well based on the results. That is, the operator may interpret the analyzed data and modify the operating parameters of the well to increase the efficiency at which the well may produce hydrocarbons. In one embodiment, the RTU 46 may automatically determine whether the operating parameters of the well are desirable based on the results of the data analysis to achieve a desired efficiency or operating point of the well.

In addition to employing the RTU 46 to analyze data associated with a respective well, a well device, or the hydrocarbon site 30, the RTU 46 may also, as discussed above, receive analyzed data from the cloud-based computing system 12. Moreover, the computing device 26 may also receive the same analyzed data from the cloud-based computing system 12, thereby providing the operator the opportunity to interpret the analyzed data and modify the operating parameters of the well. Moreover, since the cloud-based computing system 12 may have access to additional data sources and may have more processing power as compared to the RTU 46, the operator may have access to more accurate analysis to further increase the efficiency of the operations of the well, the well device, the hydrocarbon site 30, and the like.

Although the use of the cloud-based computing system 12 with the RTU 46 may enable improved operations at the hydrocarbon site 30, the improved operations are based on the ability of the RTU 46 to communicatively couple to the cloud-based computing system 12 and the ability of a user of the RTU 46 to configure the RTU 46 correctly. Given the different types of RTUs 46 that may be used at the hydrocarbon site 30, the different types of well devices that may be employed at the hydrocarbon site 30, and different conditions that may be present at the hydrocarbon site 30, it may be difficult for a user to accurately configure the RTU 46 to communicatively couple to the cloud-based computing system 12 and to effectively control the operations of an associated well device.

Cloud-Based Automatic Detection and Configuration of RTUs

Keeping the foregoing in mind, by providing the cloud-based communication architecture 20 of FIG. 3, the RTU 46 may be capable of automatically connecting with the cloud-based computing system 12, which may then automatically provide configuration data to the RTU 46. In this way, any user, regardless of experience or expertise, may perform the initialization of the RTU 46.

Figure 6:
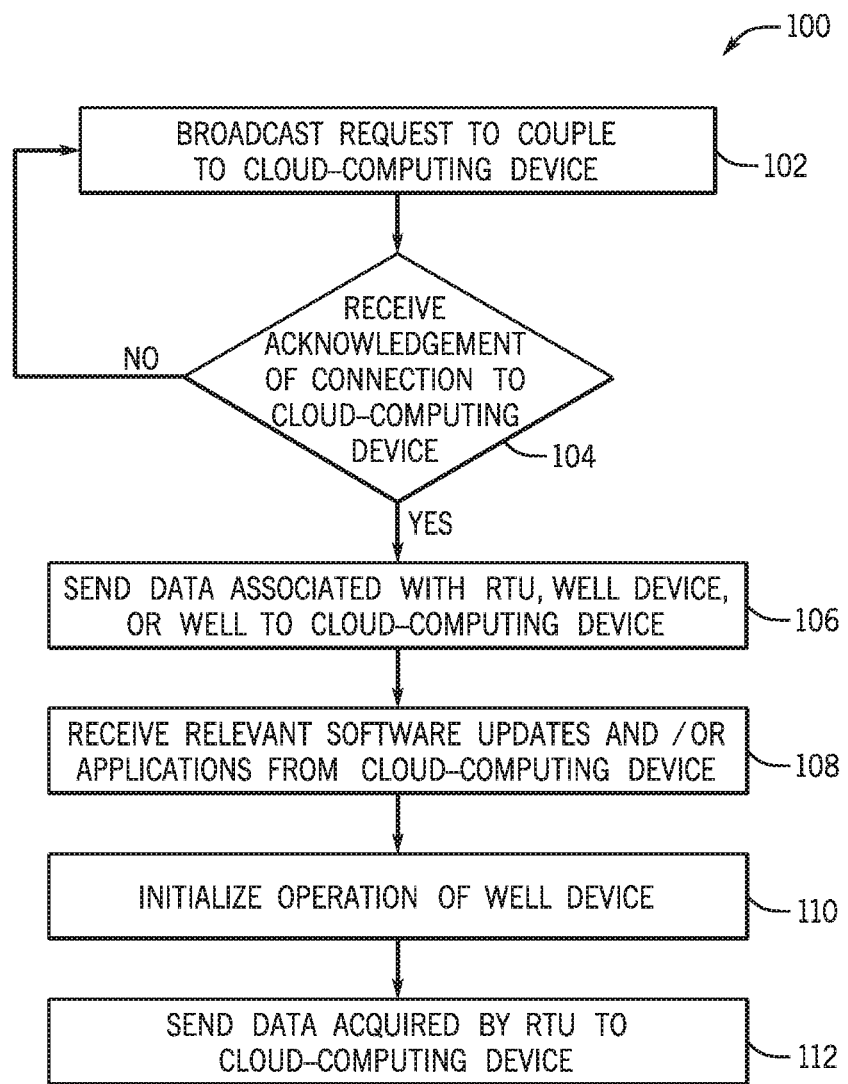
FIG. 6 illustrates a flow chart of a method for automatically configuring a remote terminal unit (RTU) in the hydrocarbon site of FIG. 2, in accordance with embodiments presented herein.

FIG. 6 illustrates a flow chart of a method 100 that the RTU 46 may employ to automatically communicatively couple to the cloud-based computing system 12. Although the method 100 is described below with respect to the RTU 46, it should be noted that the method 100 may be performed by any well device or component within the hydrocarbon site 30 that may have a processor capable of performing the steps described below. Moreover, it should be noted that the method 100 and other methods described herein may also be performed by other components in other areas, such as the industrial facility 14 of FIG. 1 and the like.

Referring now to FIG. 6, at block 102, the RTU 46 may broadcast a request to communicatively couple to the cloud-based computing system 12. As such, the RTU 46 may transmit a number of signals via the communication component 72 to determine whether any cloud-based computing system 12 is within a particular communication range of the RTU 46. The signals broadcast by the RTU 46 may include identification data regarding the RTU 46 and/or an indication that a presence of the RTU 46. In one embodiment, the signals broadcast by the RTU 46 may be received and rebroadcast by the gateway device 92 to extend the range in which the signals broadcast by the RTU 46 may travel. Otherwise, in some embodiments, the RTU 46 may establish a communication link to the cloud-based computing system 12 via the gateway device 92, the cloud gateway 22, or any other intermediary communication component.

At block 104, the RTU 46 may receive an acknowledgement message from the cloud-based computing system 12 indicating that the cloud-based computing system 12 has recognized the presence of the RTU 46. The acknowledgement message may also verify to the RTU 46 that the RTU 46 has communicatively coupled to the cloud-based computing system 12.

After receiving the acknowledgement message, at block 106, the RTU 46 may send data related to the RTU 46, a well device associated with the RTU 46, a collection of well devices associated with the RTU 46, a well site associated with the RTU 24, the hydrocarbon site 30 associated with the RTU 46, and the like. Examples of the data related to the RTU 46 may include an indication of an identity of the RTU 46, a location (e.g., global positioning system (GPS) coordinate) of the RTU 46, a context or relationship of the RTU 46 within the cloud-based communication architecture 20, a vendor associated with the RTU 46, a model number associated with the RTU 46, a serial number associated with the RTU 46, a firmware version associated with the RTU 46, a well device software application associated with the RTU 46, and the like. Data related to the well device may include an indication of a type of the well device (e.g., ESP, GL, RPC, PCP, etc.), a location (e.g., GPS coordinates) associated with the well device, a vendor associated with the well device, a model number associated with the well device, and the like.

The data may also provide details regarding the well site associated with the RTU 24. That is, the data may indicate a location (e.g., GPS coordinates) associated with the well site, a type of well site that is being monitored and/or controlled. For instance, the well site may be a land oil site, a subsea oil site, a gas site, a shale gas site, or the like.

In addition to the data described above, the RTU 24 may also transmit work instructions or work flows containing commissioning instructions for the RTU 24, a well device associated with the RTU 24, or collection of well devices associated with the RTU 24, or the like to the cloud-based computing system 12. As such, the cloud-based computing system 12 may store the commissioning instructions for the RTU 24 or other well devices for distribution to various users in the cloud-based communication architecture 20.

Referring back to FIG. 6, at block 108, the RTU 24 may receive any relevant firmware and/or software updates from the cloud-based computing system 12. Generally, upon receiving the data from the RTU 24 (block 106), the cloud-based computing system 12 may identify any relevant firmware and/or software updates associated with the RTU 24 that may be available on the database 24, the Internet, the Intranet, or the like.

In addition to updates, the RTU 24 may also receive well device software application or software applications executable by the RTU 24 and used to control and/or monitor the well device(s). Here, the cloud-based computing system 12 may identify the appropriate software application to provide the RTU 46 based on the data acquired at block 106.

After receiving the software application, at block 110, the RTU 24 may initialize its operation and/or the operation(s) of associated well device(s). As such, the RTU 24 may execute the software application received at block 108. The software application may be used to enable the RTU 46 to interface with the well device, various sensors associated with the well device or the well site, and the like. The software application may thus be used to monitor and/or control the well device.

In one embodiment, the initialization of the RTU 24 or the well device(s) may involve certain commissioning steps to be performed by one or more operators at the hydrocarbon site 30. In this case, the RTU 24 or the cloud-based computing system 12 may send the commissioning instructions or workflows for the RTU 24 and/or the associated well devices to the computing device 26 associated with an appropriate user. Additional details regarding the commissioning of the well device will be discussed below with reference to FIGS. 15-17.

After initialization, the RTU 24 may begin receiving data acquired from various sensors communicatively coupled to the RTU 24. The data may be associated with the well devices, the well site, or the like. In certain embodiments, at block 112, the RTU 24 may transmit the acquired data to the cloud-based computing system 12, which may store the acquired data in the database 24, a relationship-based database, or the like. Since the cloud-based computing system 12 may receive this acquired data from a number of RTUs 46 disposed in the hydrocarbon site 30, the cloud-based computing system 12 may use all of this stored data to provide data analysis operations, simulation operations, and the like. The different types of analyses that may be performed by the cloud-based computing system 12 will be discussed below with reference to FIGS. 10-13.

Figure 7:
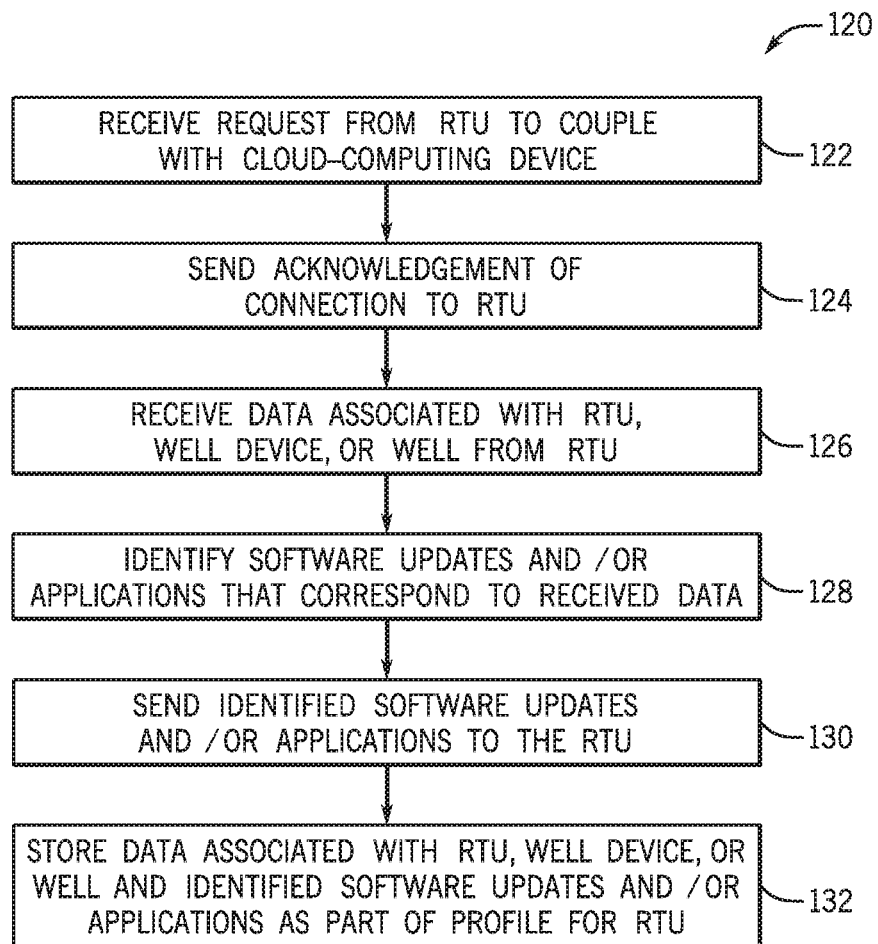
FIG. 7 illustrates a flow chart of a method for automatically connecting a remote terminal unit (RTU) to a cloud-based computing system in the hydrocarbon site of FIG. 2, in accordance with embodiments presented herein.

As mentioned above, the method 100 describes the process for automatically configuring the RTU 46 from the perspective of the RTU 46. FIG. 7, on the other hand, illustrates a flow chart of a method 120 for automatically configuring the RTU 46 from the perspective of the cloud-based computing system 12. As discussed above, although the method 120 is described with reference to the RTU 46, it should be understood that the method 120 may be employed with other types of devices and systems.

At block 122, the cloud-based computing system 12 may receive the request (block 102) from the RTU 46 to communicatively couple to the cloud-based computing system 12. Upon receiving the request, at block 124, the cloud-based computing system 12 may send the acknowledgement message to the RTU 46 to indicate that the RTU 46 has established a communication link with the cloud-based computing system 12.

At block 126, the cloud-based computing system 12 may receive the data sent from the RTU 24 described above with reference to block 106. Using the received data, at block 128, the cloud-based computing system 12 may identify firmware/software updates and/or software applications that may correspond to the RTU 46. In one embodiment, the cloud-based computing system 12 may maintain a database that stores recent versions of firmware and/or software applications for various components that may be disposed in the hydrocarbon site 30. As such, the cloud-based computing system 12 may retrieve the recent versions of the firmware and/or software applications from the database or the like.

The software applications may be identified based on the properties of the well device(s) and the well site associated with the RTU 46. For example, the data received at block 126 may indicate that the well site may use an artificial lift well device to produce hydrocarbons at the well site. As a result, the cloud-based computing system 12 may send software applications to the RTU to operate the well device in an artificial lift mode.

Alternatively, upon receiving the data from the RTU 46, the cloud-based computing system 12 may query the Internet, the Intranet, the database 24, or any other data repository for any available versions of the firmware or software associated with the RTU 46. If the cloud-based computing system 12 discovers that a more recent version of the firmware or the software application associated with the RTU 46 is available, the cloud-based computing system 12 may download the recent versions, send the recent versions to the RTU 46, and store the recent versions in the database 24 and the like.

At block 130, the cloud-based computing system 12 may send the identified firmware/software updates and/or software applications to the RTU 46. Here, the RTU 46 may begin monitoring and/or operating the corresponding well device(s). In one embodiment, in addition to sending the software applications, the cloud-based computing system 12 may send configuration parameters to the RTU 46 to specify the operations of the RTU 46. The cloud-based computing system 12 may determine the configuration parameters of the RTU 46 based on the data received at block 126 and according to data regarding similar RTUs 46 operating under similar conditions as the respective RTU 46. After sending the updates, software applications, and configuration parameters to the RTU 46, at block 132, the cloud-based computing system 12 may store the data associated with the RTU 46, the well device(s), the well site, and the like as part of profile for the respective RTU 46. In this manner, the cloud-based computing system 12 may maintain a record of various properties regarding the RTU 46. This record or profile regarding the RTU 46 may then be used by the cloud-based computing system 12 when a similar RTU 46 is placed in the hydrocarbon site 30 or when a preexisting RTU 46 is replaced with a new RTU 46.

Figure 8:
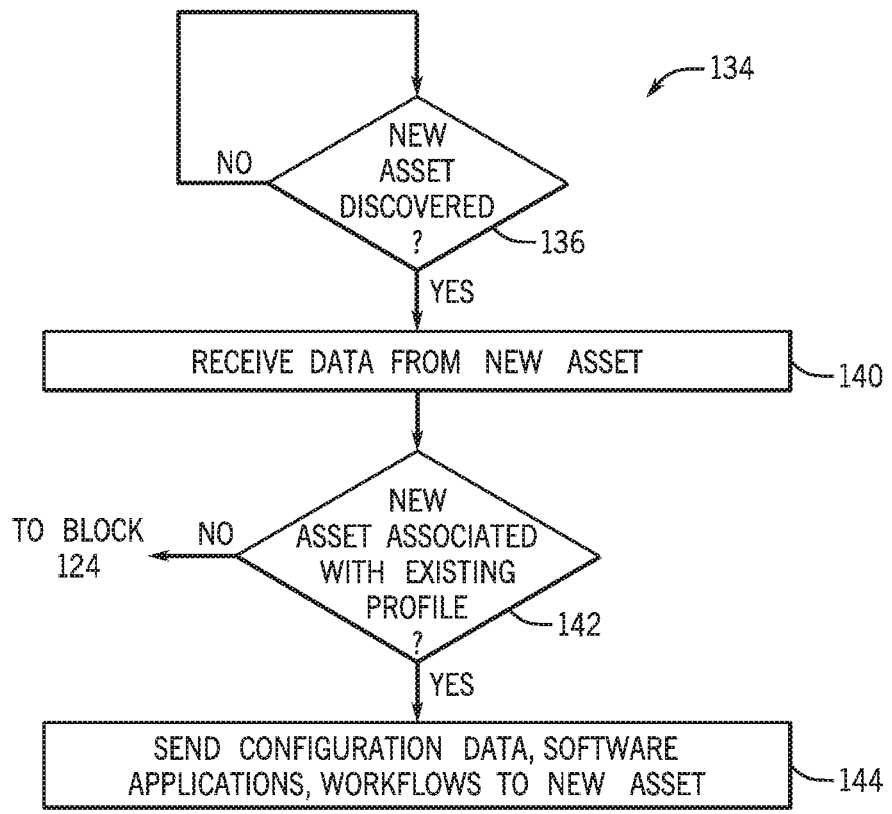
FIG. 8 illustrates a flow chart of a method for sending configuration data to an asset recently added to the cloud-based communication architecture of FIG. 3, in accordance with embodiments presented herein.

With this in mind, FIG. 8 illustrates a method 134 employed by the cloud-based computing system 12 to automatically configure a new asset discovered in the hydrocarbon site 30. At block 136, the cloud-based computing system 12 may determine whether a new asset (e.g., RTU 46, well device, etc.) has been discovered. As such, the cloud-based computing system 12 may receive a signal from the asset and determine whether the asset has been previously identified as a communicatively coupled device. If the cloud-based computing system 12 determines that the signal corresponds to an asset already communicatively coupled to the cloud-based computing system 12, the cloud-based computing system 12 may return to block 136.

If, however, the cloud-based computing system 12 determines that the signal corresponds to an asset that was not communicatively coupled to the cloud-based computing system 12, the cloud-based computing system 12 may proceed to block 140. At block 140, the cloud-based computing system 12 may receive data from the new asset regarding the new asset. As such, the cloud-based computing system 12 may receive data similar to the data described above with respect to block 106.

Upon receiving the data associated with the new asset, at block 142, the cloud-based computing system 12 may determine whether the new asset is associated with any existing asset profiles accessible by the cloud-based computing system 12. That is, the cloud-based computing system 12 may determine whether the data received at block 140 corresponds to data that pertains to a particular profile of another asset previously communicatively coupled to the cloud-based computing system 12. For example, the cloud-based computing system 12 may determine that the new asset has the same GPS coordinates as another asset previously coupled to the cloud-based computing system 12. If the new asset has the same or substantially similar GPS coordinates as indicated in a profile of another asset, the cloud-based computing system 12 may assume that the new asset is a replacement for the previously connected asset, and proceed to block 124 as previously discussed.

In another example, the cloud-based computing system 12 may determine whether the new asset is similarly associated with a number of properties (e.g., type of well device, type of well site, vendor) as another asset, as indicated in the profile for the other asset. Here, the cloud-based computing system 12 may send a notification to the new asset or to a user associated with the new asset via the computing device 26 recommending configuring the new asset like the other asset.

At block 144, the cloud-based computing system 12 may send data associated with the identified profile to the new asset. As such, the cloud-based computing system 12 may send configuration data (e.g., gateway configuration, RTU configuration, instrument configuration (well devices), firmware, firmware updates, software applications, software application updates, etc.) to the new asset.

To ensure that the configuration data made available to new assets are relevant and useful, the various assets communicatively coupled to the cloud-based computing system 12 may continuously send updates regarding their respective configuration data to the cloud-based computing system 12. With this in mind, FIG. 9 illustrates a method 146 that the asset (e.g., RTU 46) may employ to ensure that the cloud-based computing system 12 maintains a current database of profiles for various assets disposed in the hydrocarbon site 30.

Figure 9:
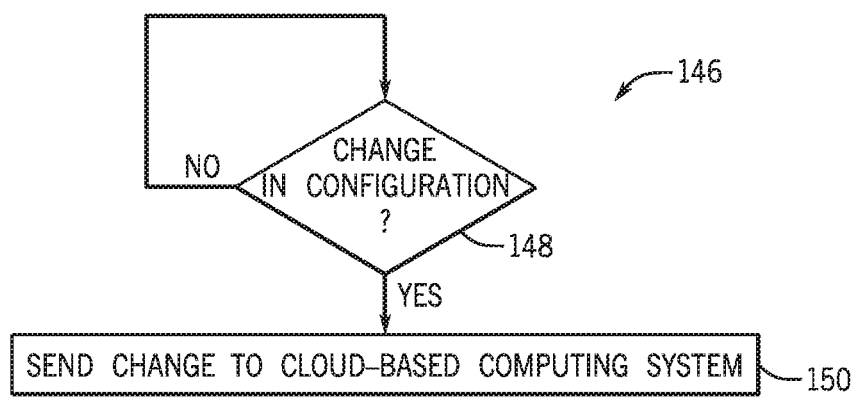
FIG. 9 illustrates a flow chart of a method for a cloud-based computing system to update a profile of a recently modified asset in the cloud-based communication architecture of FIG. 3, in accordance with embodiments presented herein.

Referring now to FIG. 9, at block 148, the RTU 46, for example, may determine whether it receives a change in configuration. That is, the RTU 46 may detect when the RTU 46 is physically moved, when the software application is altered, or the like. When this change is detected, the RTU 46 may proceed to block 150.

At block 150, the RTU 46 may send an indication of the change to the cloud-based computing system 12. As such, the cloud-based computing system 12 may update a respective profile to ensure that the profile remains current.

Cloud-Based Data Analysis

Figure 10:
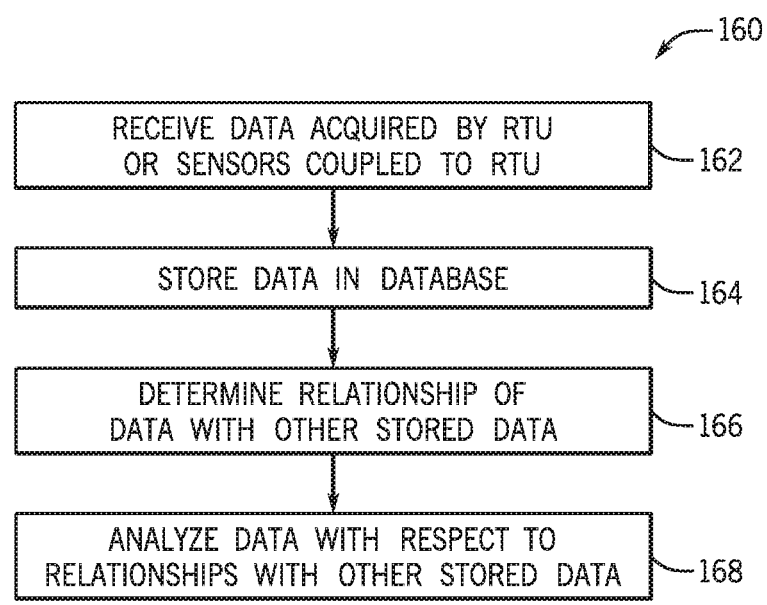
FIG. 10 illustrates a flow chart of a method for analyzing data acquired by a remote terminal unit (RTU) in the cloud-based communication architecture of FIG. 3, in accordance with embodiments presented herein.

After the RTU 46 has been initialized and is operational, the cloud-based computing system 12 may use its relatively large processing power, as compared to the processing power of the RTU 46 or the computing device 26, and access to various different data sources to perform complex analyses with the data acquired by the RTU 46. FIG. 10, for instance, illustrates a method 160 that may be employed by cloud-based computing system 12 to analyze data acquired by the RTU 46. Although the method 160 is described with respect to data acquired by the RTU 46, it should be understood that the method 160 may be performed using any data received by the cloud-based computing system 12.

At block 162, the cloud-based computing system 12 may receive the data acquired by the RTU 46, by sensors communicatively coupled to the RTU 46, or the like. Upon receiving the data, at block 164, the cloud-based computing system 12 may store the data in the database 26 or some media storage device accessible to the cloud-based computing system 12.

At block 166, the cloud-based computing system 12 may determine whether other data related to the data received at block 162 exists. That is, the cloud-based computing system 12 may determine whether historical data associated with the RTU 46 exists, data that corresponds to a well device associated with the RTU 46, data related to the well site associated with the RTU 46, and the like. As such, the cloud-based computing system 12 may determine or identify relationships between the data received at block 166 and the data accessible to the cloud-based computing system 12.

At block 168, the cloud-based computing system 12 may analyze the data received at block 162 with respect to the relationships determined at block 168. In other words, the cloud-based computing system 12 may compare the data received at block 162 with the data identified at block 166 to draw inferences, predictions, or recommendations regarding the operation of the well device(s), the production at the well site, or the like.

In some embodiments, the analyses performed at block 168 may include generating visualizations or graphs that depict trends associated with the data received at block 162. The analyses may also include determining a production summary at the well site, an availability of the well device(s), individual key performance indicators (KPIs), aggregate KPIs, and the like. In one embodiment, the analysis may include performing multiphase analysis regarding the production of the hydrocarbons at the well site. That is, the cloud-based computing system 12 may determine an amount of oil, water, and sand that may be within the extracted hydrocarbons.

In addition to providing analyses results, the cloud-based computing system 12 may perform various monitoring operations with respect to the data received at block 162. For example, the cloud-based computing system 12 may display various process parameters regarding the operation of the well device, the RTU 46, the well site, and the like. Moreover, the cloud-based computing system 12 may display the data received at block 162 to help enable the user to understand the present state of the RTU 46, the well device(s), the well site, and the like. The displayed data may include indications listing the type of well devices and/or equipment present at the well site, a strength of communication signal between the RTU 46 and the cloud-based computing system 12, In one embodiment, an amount of power available for various well devices at the well site, any indication of any alarms or notifications regarding the well device(s), the RTU 46, or the well site, and the like.

After receiving the results of the analyses discussed above, the cloud-based computing system 12 may send commands to the RTU 46 to adjust the operations of the well device(s) in view of the analyses. Generally, the commands may adjust the operations of the well device(s) to improve the production of hydrocarbons at the well site. However, the commands may also be designed to decrease an amount of stress on the well device(s) to ensure that the well devices(s) do not fail or has an improved life cycle.

Figure 11:
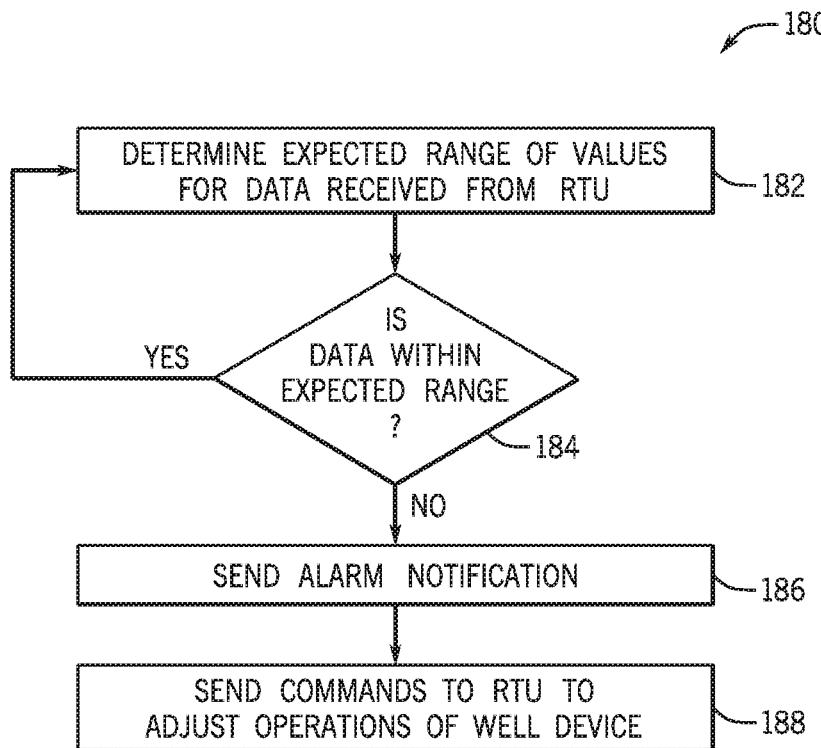
FIG. 11 illustrates a flow chart of a method for adjusting operations of a well device based on data analysis performed by a cloud-based computing system, in accordance with embodiments presented herein.

By way of example, the FIG. 11 illustrates a method 180 that the cloud-based computing system 12 may employ to control the operations of a well device based on the data acquired by the RTU 46. At block 182, the cloud-based computing system 12 may determine an expected range of values for the data acquired by the RTU 46. The cloud-based computing system 12 may determine the expected range of values based on historical data associated with the data acquired by the RTU 46 or other data similar to the data acquired by the RTU 46.

At block 184, the cloud-based computing system 12 may determine whether the data received from the RTU 46 is within the expected range of values. If the data is within the expected range, the cloud-based computing system 12 may return to the block 182 and continue to monitor the received data from the RTU 46.

If, however, the data is not within the expected range, the cloud-based computing system 12 may proceed to block 186 and send an alarm notification to the RTU 46, to the computing device 26, or the like. At block 188, the cloud-based computing system 12 may send commands to the RTU 46 to adjust the operations of the well device controlled by the RTU 46 to cause the data received from the RTU 46 to be within the expected range of values.

Figure 12:
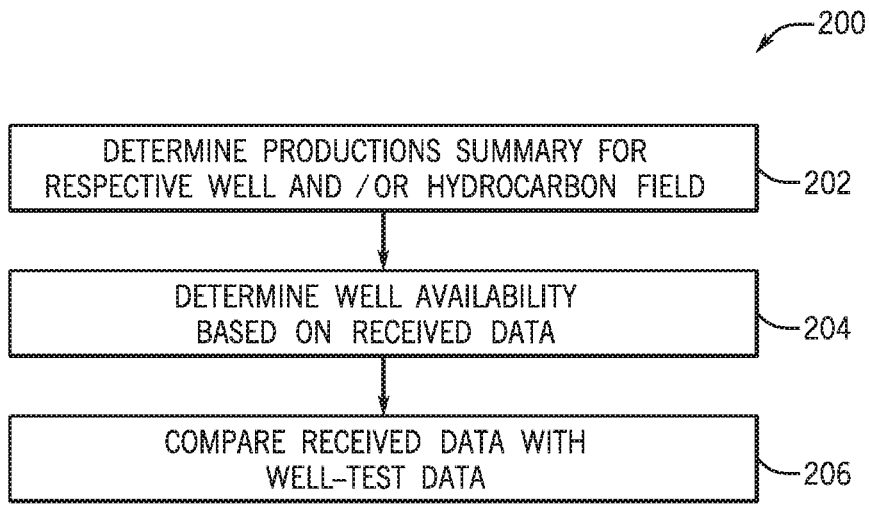
FIG. 12 illustrates a flow chart of a method for performing various types of analysis on data acquired by a remote terminal unit (RTU) in the hydrocarbon site of FIG. 2 using a cloud-based computing system, in accordance with embodiments presented herein.

In addition to adjusting the operations of the well device based on the expected range of values associated with the data received from the RTU 46, the cloud-based computing system 12 may perform various other types of analyses based on the data received from the RTU 46. For instance, FIG. 12 illustrates a flowchart of a method 200 of various types of analyses that may be performed by the cloud-based computing system 12. At block 202, the cloud-based computing system 12 may determine a production summary for a well site that corresponds to the RTU 46. In some embodiments, the cloud-based computing system 12 may aggregate the production summary for the respective well site with the production summary of a hydrocarbon field associated with the respective well site. That is, the cloud-based computing system 12 may retrieve data associated with the production data of the respective hydrocarbon field and aggregate the retrieved data with the data received from the RTU 46.

At block 204, the cloud-based computing system 12 may determine the availability of the well based on the data received from the RTU 46. Here, the cloud-based computing system 12 may analyze the operational patterns of the well device based on the data from the RTU 46.

In yet another analysis performed by the cloud-based computing system 12, at block 206, the cloud-based computing system 12 may compare the data received from the RTU 46 with well test data associated with the respective well site. As such, the cloud-based computing system 12 may determine the phases of the hydrocarbon production based on the data received from the RTU 46. The cloud-based computing system 12 may then compare the phases of the hydrocarbon production with the phases indicated in the well test. If the phases are not substantially similar, the cloud-based computing system 12 may send a notification to a user via the RTU 46 and/or the computing device 26 to perform another well test, schedule a maintenance operation at the well site, or the like.

Figure 13:
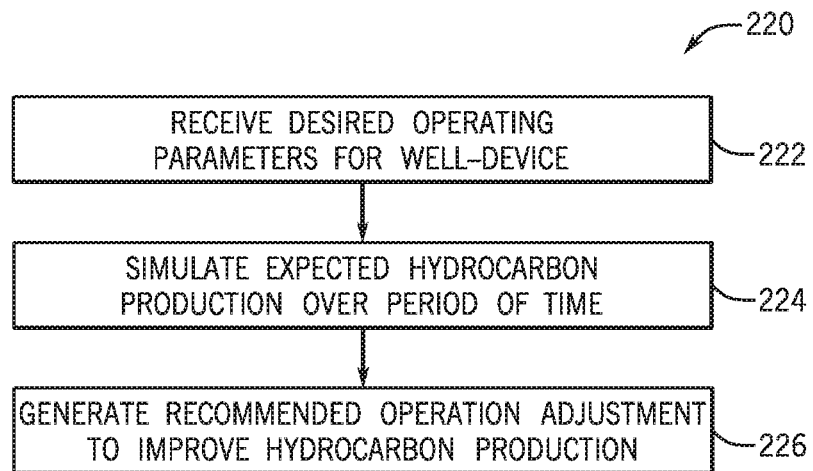
FIG. 13 illustrates a flow chart of a method for simulating production of hydrocarbons at the hydrocarbon site of FIG. 2 using a cloud-based computing system, in accordance with embodiments presented herein.

FIG. 13 illustrates a flowchart of a method 220 for adjusting the operation of the well device based on simulations or projections determined based on the data received from the RTU 46. At block 222, the cloud-based computing system 12 may receive a scenario or desired operating parameters of the well device and/or the well site.

At block 224, the cloud-based computing system 12 may simulate or project and expected amount of hydrocarbon production over a certain period of time. Based on this projection, at block 226, the cloud-based computing system 12 may determine whether improved operations may be attained by adjusting the operations of the well device. The cloud-based computing system 12 may determine whether the improved operations may be attained based on other data related to the production at other well sites operating under the same parameters received at block 222. After the cloud-based computing system 12 determines the adjustments in the operations, the cloud-based computing system 12 may generate a recommendation including the adjustments for the user of the RTU 46. As such, the cloud-based computing system 12 may send the recommendation to the user via the RTU 46, the computing device 26, or the like.

Cloud-Based Commissioning

As mentioned above, the cloud-based computing system 12 may store commissioning instructions or workflows associated with the RTU 46, the well device(s), or the like. In this way, the commissioning of the RTU 46, the well device, the collection of well devices, and the like may be implemented more effectively and efficiently. Generally, the commissioning instructions may include a set of work instructions to be performed by one or more users (e.g., hydrocarbon site personnel) at the hydrocarbon site 30. Certain steps or parts of the work instructions may be performed by a particular user, in a particular order, or the like.

Figure 14:
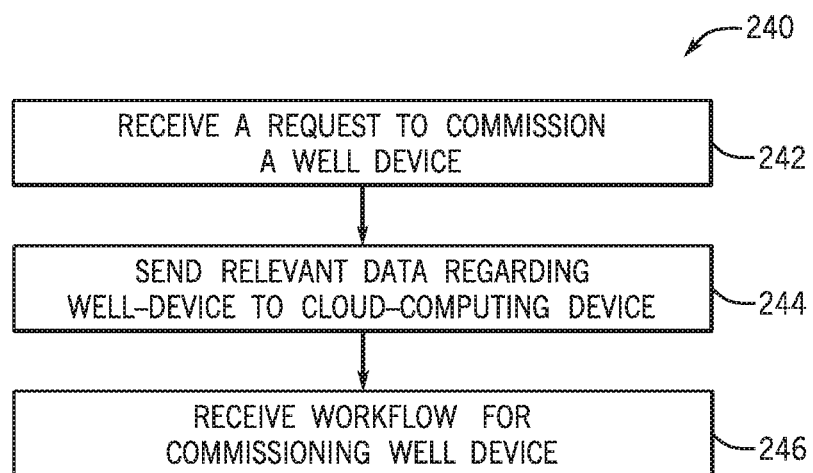
FIG. 14 illustrates a flow chart of a method for acquiring information regarding commissioning of a well device or a system of well devices at the hydrocarbon site of FIG. 2 using a cloud-based computing system, in accordance with embodiments presented herein.

As mentioned above, the RTU 46 may send the commissioning instructions regarding itself, a respective well device, and/or a respective collection of well devices to the cloud-based computing system 12. Keeping this in mind, FIG. 14 illustrates a method 240 that the computing device 26 may perform to receive a workflow for commissioning a well device. Although the method 240 is described herein as being performed to receive the commissioning workflow regarding the well device, it should be understood that the method 240 may provide commissioning workflow regarding any type of device or system, such as the RTU 46, a collection of well devices, and the like.

At block 242, the computing device 26 may receive a request to commission a well device. The request may be received via an input at the computing device 26 such as a keyboard input, a mouse input, a display input, and the like.

At block 244, the computing device 26 may send relevant data regarding the well device being commissioned to the cloud-based computing system 12. In one embodiment, the computing device 26 may be associated with a respective RTU 46, the respective well device, or a user associated with the respective computing device 26, the respective RTU 46, and/or the respective well device. As such, the relevant data may include information identifying the well device being commissioned, the RTU 46 associated with the respective well device, the user associated with the respective computing device 26, or the like. Using this data, the cloud-based computing system 12 may identify the commissioning instructions or workflow associated with the well device being commissioned.

As discussed above, the cloud-based computing system 12 may have access to a profile regarding the respective well device. As such, upon receiving the relevant data from the computing device 26, the cloud-based computing system 12 may retrieve the profile associated with the relevant data and identify the commissioning instructions for the respective well device.

At block 246, the computing device 26 may receive the commissioning instructions or the workflow for the respective well device. In this way, the user of the computing device 26 may receive the workflow for commissioning the well device. The commissioning instructions or workflow may include data sheets associated with the respective well device, a work order associated with the respective well device, an indication of personal protective equipment recommended to operation the respective well device, safety information associated with the respective well device, troubleshooting instructions associated with the respective well device, knowledge-base documents associated with the respective well device, webpages associated with the respective well device, a commissioning schedule associated with the respective well device, and the like. The commissioning schedule may include a hierarchical or specified order in which the instructions are to be performed.

In one embodiment, the computing device 26 may also receive a video or an Internet-based address to a video regarding the workflow. As such, the computing device 26 may then display the video on its respective display to provide a more comprehensive visualization of the workflow. In addition to depicting the workflows, the computing device 26 may visualize well devices used in the hydrocarbon site 30, production elements of a production environment, or the like. The well devices displayed on the display of the computing device 26 and/or control operations that may be performed by the computing device 26 may be contextualized according to the a role of the respective user of the computing device 26. As such, in some embodiments, the actions available to the user may be restricted based on the user's role, a proximity within the hydrocarbon site 30 (e.g. GPS coordinates, blue tooth connection to a device, scanner, etc.), and the like.

In certain embodiments, the cloud-based computing system 12 may distribute commissioning instructions among a number of users. That is, the cloud-based computing system 12 may send commissioning instructions to a number of computing devices 26 associated with a number of respective users. Each respective commissioning instruction may include instructions associated with the respective user. That is, each of the number of users may have a specified role or assignment associated with the commission of the well device. As such, upon receiving a request to commission the well device, the cloud-based computing system 12 may send a number of different computing systems 26 associated with a respective number of different users based on the respective roles of the users.

Figure 15:
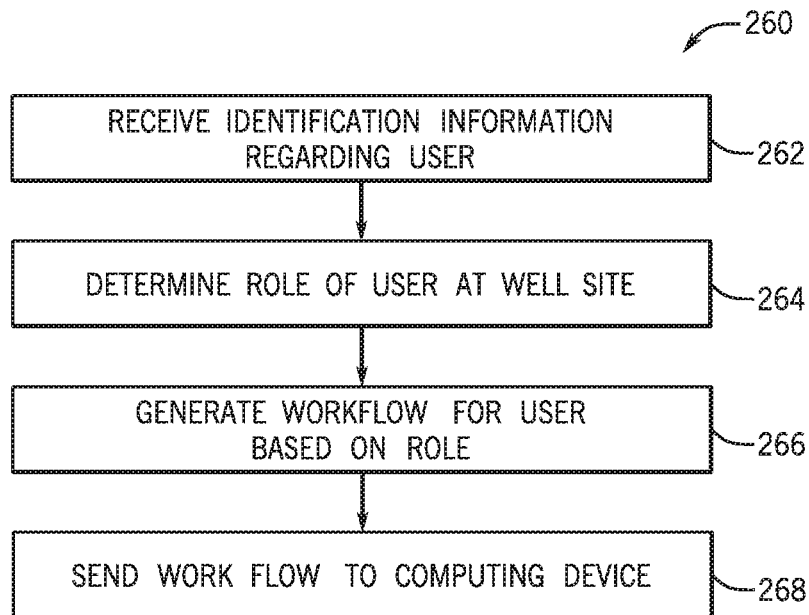
FIG. 15 illustrates a flow chart of a method for creating a workflow for a user at the hydrocarbon site of FIG. 2 using a cloud-based computing system, in accordance with embodiments presented herein.

For instance, FIG. 15 illustrates a method 260 that the cloud-based computing system 12 may employ to distribute workflows to different users in the hydrocarbon site 30. At block 262, the cloud-based computing system 12 may receive identification information regarding the user. The identification information may be acquired via login information at the computing device 26, via scanning components that scan a badge or key associated with the respective user, facial recognition technology, or the like.

At block 264, the cloud-based computing system 12 may determine a role of the user based on the received identification information. The role of the user may be stored in the cloud-based computing system 12, the database 24, or the like as a profile, as discussed above. In certain embodiments, the role of the user may define a relationship of the respective user with regard to the commissioning of some component. Alternatively, the role of the user may define a relationship of the respective with regard to the hydrocarbon site 30 as a whole.

The role of the user may be determined according to a title of the user, certifications acquired by the user, trainings performed by the user, and the like. In one embodiment, the role of the user may be pre-defined by another entity.

In any case, at block 266, the cloud-based computing system 12 may generate a workflow for commissioning a respective component based on the role of the user. For instance, if the workflow for commission the component involves a number of users, the cloud-based computing system 12 may send a number of computing devices 26 different workflows based on the roles of the users associated with the respective computing devices 26.

After generating the workflow, at block 268, the cloud-based computing system 12 may send the workflow to the respective computing device 26. In one embodiment, the cloud-based computing system 12 may also send a video or an Internet-based address to a video regarding the workflow. As such, the computing device 26 may then display the video on its respective display to provide a more comprehensive visualization of the workflow.

At times, the commissioning of a component may involve a number of different users performing a number of different workflows in a particular order. Here, the cloud-based computing system 12 may manage the distribution of the respective workflows as requisite workflows or instructions are completed. By way of example, FIG. 16 illustrates a method 270 for managing the distribution of portions of a workflow according to some order.

At block 272, the cloud-based computing system 12 may receive an indication that a portion of an entire workflow has been completed. In one embodiment, the cloud-based computing system 12 may receive data from the computing device 26 as each step or instruction of the portion of the workflow assigned to the respective user of the computing device 26 is completed. For example, the cloud-based computing system 12 may receive a signature of the user, thereby indicating that the portion of the workflow assigned to the respective user is completed.

At block 274, the cloud-based computing system 12 may determine whether the entire workflow is complete. If the entire workflow is complete, the commissioning of the respective component may be complete. However, if the entire workflow is not complete, the cloud-based computing system 12 may proceed to block 276.

At block 276, the cloud-based computing system 12 may identify other users, computing devices 26, or RTUs 46 that may be associated with a subsequent portion of the workflow. Upon identifying the appropriate computing device 26 associated with the subsequent portion of the workflow, at block 278, the cloud-based computing system 12 may send the next portion of the workflow to the respective computing device 26. As such, the respective user may perform the subsequent portion of the workflow. The cloud-based computing system 12 may then return to block 272 and continuously perform the method 270 until the entire workflow is complete.

In some instances, the user at the hydrocarbon site 30 may request operational or technical support regarding the RTU 46, the well device, or any other component at the hydrocarbon site 30. With this in mind, FIG. 17 illustrates a flowchart of a method 280 that the cloud-based computing system 12 may perform to retrieve appropriate support for a user.

Referring now to FIG. 17, at block 282, the cloud-based computing system 12 may receive a request for support regarding an operation of a well device, the RTU 46, or any component in the hydrocarbon site 30. Upon receiving this request, the cloud-based computing system 12 may, at block 284, identify a user having a profile that indicates that the respective user may have a high likelihood of providing the requested support. In one embodiment, the cloud-based computing system 12 may identify the user based on trainings performed by the respective user, certifications associated with the respective user, pre-defined associations or credentials regarding the respective user, or the like. In another embodiment, the cloud-based computing system 12 may identify users based on the users' respective proximities to the user requesting the support. As such, the cloud-based computing system 12 may receive location information regarding each user that may potentially assist the user requesting the support, along with location information related to the user requesting support. The location information of any user may be determined based on GPS coordinates associated with the user, Bluetooth® identification keys receive via the RTU 46 or the computing device 26, or the like.

At block 286, the cloud-based computing system 12 may send a notification to the identified user indicating that his/her support is requested by another user. The notification may be sent via electronic mail, SMS test message, a visualization depicted on the display of the respective computing device 26, or the like. In certain embodiments, the notification may include a link to a live video feed from the computing device 26 of the user requesting the support. As such, the user requesting the support may more precisely explain and show the problem to the expert user.

Although the techniques described in FIGS. 14-17 have been described with respect to commission some component, it should be noted that the techniques of FIGS. 14-17 may be applied to any type of work instruction. For example, upon detecting a problem, the cloud-based computing system 12 may send work instructions to troubleshoot or solve the detected problem using the methods of FIGS. 14-17 described above.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method, comprising:
receiving, via at least one processor of a cloud-computing system, an indication that a portion of a workflow is complete, wherein the workflow comprises a plurality of instructions for commissioning one or more well devices at a hydrocarbon site;
identifying a subsequent portion of the workflow to be performed in response to receiving the indication that the portion of the workflow is complete;
identifying a user to assign to a first well device of the one or more well devices based on the subsequent portion and based on a proximity between the first well device and a computing device associated with the user; and
sending the subsequent portion to the computing device in response to identifying the user.

2. The method of claim 1, comprising, before identifying the user, determining the proximity between the first well device and the computing device based on global positioning system (GPS) coordinates of the computing device or one or more Bluetooth identification keys of the computing device.

3. The method of claim 1, wherein the user is identified based on the subsequent portion in response to determining an association between the subsequent portion and at least one role associated with the user.

4. The method of claim 3, comprising determining the at least one role associated with the user is based on one or more titles associated with the user, one or more certifications acquired by the user, one or more trainings performed by the user, or any combination thereof.

5. The method of claim 1, comprising, before receiving the indication that the portion of the workflow is complete, receiving the workflow from at least one of the one or more well devices.

6. The method of claim 1, comprising transmitting an instructional video associated with the subsequent portion of the workflow to the computing device in response to identifying the user.

7. The method of claim 1, comprising restricting one or more additional users from performing the subsequent portion of the workflow based on one or more respective proximities between the first well device and one or more respective computing devices associated with the one or more additional users.

8. The method of claim 1, comprising:
receiving a second indication that the subsequent portion of the workflow is complete;
identifying a second subsequent portion of the workflow to be performed in response to receiving the second indication;
identifying a second user to assign to a second well device of the one or more well devices based on the second subsequent portion and based on a second proximity between the second well device and a second computing device associated with the second user; and
sending the second subsequent portion to the second computing device in response to identifying the second user.

9. The method of claim 1, comprising:
receiving a request for support associated with the subsequent portion of the workflow from the computing device;
identifying a second user that is associated with the subsequent portion and associated with a second computing device that is located within a second proximity of the computing device; and
sending a notification indicative of the request to the second computing device.

10. A system, comprising:
a cloud-computing system comprising at least one processor, wherein the at least one processor is configured to:
transmit a portion of a workflow to a first computing device associated with a first user, wherein the workflow comprises one or more instructions for commissioning an operation of a well device at a hydrocarbon site;
receive a request for support associated with the operation of the well device from the first computing device;
identify a second user that is associated with the operation of the well device and associated with a second computing device that is located within a proximity of the first computing device; and
send a notification indicative of the request to the second computing device.

11. The system of claim 10, wherein, before identifying the second user, the at least one processor is configured to determine the proximity based on a first set of global positioning system (GPS) coordinates of the first computing device and a second set of GPS coordinates of the second computing device.

12. The system of claim 10, wherein the at least one processor is configured to identify the second user from a plurality of second users based on the proximity of the second computing device to the first computing device.

13. The system of claim 10, wherein the at least one processor is configured to identify the second user based on the second user being associated with the operation of the well device.

14. The system of claim 13, wherein the at least one processor is configured to determine that the second user is associated with the operation of the well device based on a profile of the second user indicating that the second user is qualified to assist the first user with performing the operation.

15. The system of claim 10, wherein the notification comprises a link to view a live video stream provided by the first computing device.

16. The system of claim 10, wherein, before transmitting the portion of the workflow to the first computing device, the at least one processor is configured to identify the first user to assign to the well device based on a second proximity between the well device and the first computing device.

17. A non-transitory computer-readable medium comprising computer-executable instructions that, when executed, are configured to cause one or more processors to:
receive an indication that a portion of a workflow is complete, wherein the workflow comprises a plurality of instructions for commissioning one or more operations of a well device at a hydrocarbon site;
identify a subsequent portion of the workflow to be performed based on the indication;
identify a user to assign to the well device based on:
an association between the user and the subsequent portion; and
a proximity between the well device and a computing device associated with the user; and
send the subsequent portion to the computing device in response to identifying the user.

18. The non-transitory computer-readable medium of claim 17, wherein the computer-executable instructions are configured to cause the one or more processors to determine the association between the user and the subsequent portion based on at least one role of the user indicating that performance of the subsequent portion is permitted.

19. The non-transitory computer-readable medium of claim 17, wherein the computer-executable instructions are configured to cause the one or more processors to receive the workflow from the well device, before receiving the indication that the portion of the workflow is complete.

20. The non-transitory computer-readable medium of claim 17, wherein the computer-executable instructions are configured to cause the one or more processors to:
receive a request for support associated with the one or more operations of the well device from the computing device associated with the user;
identify a second user that is associated with the one or more operations of the well device and that is associated with a second computing device located within a second proximity of the computing device associated with the user; and
send a notification indicative of the request to the second computing device.

* * * * *